United States Patent
Maruyama et al.

(10) Patent No.: US 6,993,217 B2
(45) Date of Patent: Jan. 31, 2006

(54) OPTICAL SWITCH DEVICE

(75) Inventors: Shinji Maruyama, Yokohama (JP); Norihisa Naganuma, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/180,526

(22) Filed: Jul. 14, 2005

(65) Prior Publication Data

US 2005/0249452 A1    Nov. 10, 2005

Related U.S. Application Data

(63) Continuation of application No. PCT/JP03/06090, filed on May 15, 2003.

(51) Int. Cl.
*G02B 6/26* (2006.01)
*G02B 6/42* (2006.01)

(52) U.S. Cl. ............... 385/16; 385/15; 385/31; 385/37; 385/39; 385/46; 385/47

(58) Field of Classification Search ............... None
See application file for complete search history.

(56) References Cited

U.S. PATENT DOCUMENTS 6,049,640 A * 4/2000 Doerr ............... 385/15
6,278,813 B1 * 8/2001 Takada et al. ............... 385/24

FOREIGN PATENT DOCUMENTS

EP    0 901 024 A2    3/1999
JP    05-333384    12/1993
JP    2002-311343    10/2002

OTHER PUBLICATIONS

Patent Abstracts of Japan, Publication No. 11-133469, Published May 21, 1999.
Patent Abstracts of Japan, Publication No. 2002-072157, Published Mar. 12, 2002.
"Multi-Wavelenght 2×2 Fiber-Optic Switch Structure Using Mirror Array", Nabeel A. Riza et al., Photonic Information Processing Systems (PIPS) Laboratory, 1999 IEEE, pp. 129-130.

* cited by examiner

*Primary Examiner*—Frank G. Font
*Assistant Examiner*—Derek L. Dupuis
(74) *Attorney, Agent, or Firm*—Staas & Halsey LLP

(57) ABSTRACT

In an optical switch device: output waveguides are arranged with such a pitch as to realize a split wavelength gap equal to or smaller than half of a gap between operating wavelengths of optical signals; at least two input waveguides are arranged with the same pitch; at least one slab waveguide spreads light from the input waveguides to be outputted to a grating element, condenses first light from the grating element to be outputted into the input waveguides, condenses second light from the grating element for each wavelength to be outputted into the output waveguides, and spreads light from the output waveguides to be outputted to the grating element; and the optical switch unit selects signals at an identical wavelength in adjacent output waveguides, and performs 2×2 switching of the signals so as to output the signals from the input waveguides.

24 Claims, 17 Drawing Sheets

OPTICAL SWITCH DEVICE

CROSS-REFERENCE TO RELATED APPLICATIONS

This application is a continuing application, filed under 35 U.S.C. Section 111(a), of International Application PCT/JP2003/006090, filed May 15, 2003.

BACKGROUND OF THE INVENTION

1) Field of the Invention

The present invention relates to an optical switch device which switches optical signals for WDM (Wavelength Division Multiplex) by selecting wavelengths of the optical signals.

2) Description of the Related Art

The optical communication networks can constitute a core to form a base of a communication network, and it is desired that the services of the optical communication networks become available in wider areas and further sophisticated. In particular, development of WDM techniques constituting a core technology for constructing optical communication systems is rapidly proceeding. The WDM is a technique in which a plurality of signals are concurrently transmitted through a single optical fiber by multiplexing light having different wavelengths (colors).

In the case where a photonic network is constructed by using WDM, optical crossconnection (OXC) as a technique for switching optical signals is used for efficiently utilizing wavelength resources.

FIG. 16 is a diagram schematically illustrating an example of the optical crossconnection. In the system illustrated in FIG. 16, an OADM (Optical Add-drop Multiplexer) unit 101 and an optical switch unit 102a are connected through an optical-fiber route R1, and the optical switch unit 102a and an OADM unit 103 are connected through an optical-fiber route R2. The OADM unit 101 comprises an optical switch unit 101a, an optical combiner 101b, and an optical splitter 101c, and the OADM unit 103 comprises an optical switch unit 103a. Although not shown, the optical switch unit 103a also comprises an optical combiner and an optical splitter.

The optical combiner 101b in the OADM unit 101 multiplexes optical signals having different wavelengths, and outputs the multiplexed signals to the optical switch unit 101a. (That is, the optical combiner 101b and the optical switch unit 101a add the above optical signals to signals flowing through the optical-fiber route R1.) The optical switch unit 101a performs switching of the signals outputted from the optical combiner 101b and signals flowing through the optical-fiber route R1 according to their wavelengths so that the switched signals are outputted to the optical-fiber route R1 and the optical splitter 101c. The optical splitter 101c optically demultiplexes the multiplexed signals outputted from the optical switch unit 101a to the optical splitter 101c, and separately outputs the demultiplexed signals for respective wavelengths which the demultiplexed signals have. (That is, the optical switch unit 101a and the optical splitter 101c drop the above optical signals from the optical-fiber route R1.) The optical switch unit 102a performs switching of optical signals received from the optical-fiber routes R1 and R2. The OADM unit 103 performs operations of switching, adding, and dropping optical signals in a similar manner to the OADM unit 101.

In the example illustrated in FIG. 16, optical signals having the wavelengths $\lambda A$, $\lambda B$, $\lambda C$, and $\lambda D$ are outputted from the optical switch unit 101a onto the optical-fiber route R1, optical signals having the wavelengths $\lambda a$, $\lambda b$, $\lambda c$, and $\lambda d$ are outputted from the optical switch unit 103a onto the optical-fiber route R2. At this time, the wavelength band assigned to optical signals having the wavelength $\lambda A$, the wavelength band assigned to optical signals having the wavelength $\lambda B$, the wavelength band assigned to optical signals having the wavelength $\lambda C$, and the wavelength band assigned to optical signals having the wavelength $\lambda D$ are respectively identical to the wavelength band assigned to optical signals having the wavelength $\lambda a$, the wavelength band assigned to optical signals having the wavelength $\lambda b$, the wavelength band assigned to optical signals having the wavelength $\lambda c$, and the wavelength band assigned to optical signals having the wavelength $\lambda d$. For example, both the wavelength band assigned to optical signals having the wavelength $\lambda A$ and the wavelength band assigned to optical signals having the wavelength $\lambda a$ are a wavelength band to which the wavelength of 1,550 nm belongs. However, information conveyed by optical signals having the wavelength $\lambda A$ is generally different from information conveyed by optical signals having the wavelength $\lambda a$.

The optical switch unit 102a performs a switching operation in which optical signals on the optical-fiber route R1 and optical signals on the optical-fiber route R2 in each of at least one of the wavelength bands are exchanged. That is, information in each wavelength band is exchanged. In the situation illustrated in FIG. 16, the optical switch unit 102a exchanges optical signals at the wavelengths $\lambda A$ and $\lambda a$, and optical signals at the wavelengths $\lambda D$ and $\lambda d$. After the switching operation, the optical switch unit 102a outputs optical signals at the wavelengths $\lambda a$, $\lambda B$, $\lambda C$, and $\lambda d$ onto the optical-fiber route R1, and optical signals at the wavelengths $\lambda A$, $\lambda b$ $\lambda c$, and $\lambda D$ onto the optical-fiber route R2.

FIG. 17 is a diagram illustrating a conventional construction of the optical switch unit 102a. The optical switch unit 102a of FIG. 17 comprises optical splitters 102a-1 and 102a-2, optical combiners 102a-3 and 102a-4, and 2×2 switches SW1 to SWn. Each of the optical switch units 101a and 103a also comprises elements basically similar to the optical switch unit 102a.

The input port of the optical splitter 102a-1 is connected to an end R1in of the optical-fiber route R1 for receiving optical signals from the optical-fiber route R1, and the input port of the optical splitter 102a-2 is connected to an end R2 in of the optical-fiber route R2 for receiving optical signals from the optical-fiber route R2. The output port of the optical combiner 102a-3 is connected to an end R1out of the optical-fiber route R1 for outputting optical signals onto the optical-fiber route R1, and the output port of the optical combiner 102a-4 is connected to an end R2out of the optical-fiber route R2 for outputting optical signals onto the optical-fiber route R2.

The optical combiners are realized by array waveguide gratings (hereinafter referred to as AWGs). The AWGs are normally formed of optical circuitry using optical waveguides made of quartz-based glass, and are widely used in the WDM systems since the AWGs are suitable for mass production. The AWGs can separate optical signals having a plurality of wavelengths, and output the optical signals into a plurality of waveguides provided in correspondence with the plurality of wavelengths, or can combine optical signals having a plurality of wavelengths in a single waveguide and output the combined optical signals from the single waveguide.

As understood from FIG. 17, devices such as the optical switch unit 102a which have the function of selecting wavelength components directed to at least two different fiber routes (e.g., the optical-fiber routes R1 and R2) need four AWGs and n 2×2 switches, where n is the number of wavelengths. That is, in the case where switching of a signal in which n wavelengths are multiplexed is performed, n 2×2 switches are needed.

According to a conventionally proposed technique for an optical switch which has the function of selecting wavelength components (for example, as disclosed in Japanese Unexamined Patent Publication No. 2002-72157, paragraph Nos. 0064 and 0065 and FIG. 15), a wavelength-variable filter is formed by varying the refraction indexes of waveguides in an AWG at a predetermined rate, and applied to an optical switch.

In recent years, the explosive spread of use of the Internet and some other factors have led to steady increase in the transmission rates. In this situation, the dense WDM (DWDM) is receiving attention and development of the DWDM is proceeding. The DWDM can realize tens to hundreds of wavelength channels through a single optical fiber in such a manner that each of the wavelength channels has a transmission rate of 600 Mbps to 10 Gbps, and a bundle of a very great amount of data is transmitted at a total transmission rate on the order of 1 Tbps.

However, when optical crossconnection is performed in a photonic metro network using DWDM, optical signals in which a very great number of wavelengths are multiplexed are handled, and therefore the number of channels for which switching processing is to be performed greatly increases.

In addition, in order to realize optical crossconnection in a DWDM system handling hundreds of wavelength channels by using the optical switch unit 102a having the construction illustrated in FIG. 17, it is necessary to use large-scale AWGs which can combine and split hundreds of wavelengths and have great dimensions, and hundreds of 2×2 switches.

Therefore, in the systems using the conventional optical switch unit 102a as illustrated in FIG. 17, the size and cost of equipment increase, so that it is impossible to construct a photonic network which is economical and highly operable.

Further, it is possible to mechanically realize optical switching with switch cells using microelectromechanical elements such as the MEMS (MicroElectroMechanical Systems). However, complicated control and great equipment size required by the use of the high-density optical switching elements make downsizing and cost reduction difficult.

SUMMARY OF THE INVENTION

The present invention is made in view of the above problems, and the object of the present invention is to provide an economical and highly operable, optical switch device which includes a wavelength-selective switch having reduced size and being able to be produced at reduced cost.

In order to accomplish the above object, an optical switch device for switching optical signals is provided. The optical switch device comprises a waveguide grating and an optical switch unit. The waveguide grating includes: output waveguides arranged with such a pitch as to realize a split wavelength gap equal to or smaller than half of a gap between operating wavelengths of optical signals; at least two input waveguides arranged with the pitch; phase-difference waveguides which make optical path differences between portions of light which propagate through the phase-difference waveguides; a first slab waveguide which spreads first light transmitted through the at least two input waveguides so as to output the first light into the phase-difference waveguides, and condenses second light transmitted through the phase-difference waveguides so as to output the second light into the at least two input waveguides; and a second slab waveguide which condenses third light transmitted through the phase-difference waveguides, for each of a plurality of wavelength components of the third light, so as to separately output the plurality of wavelength components of the third light into the output waveguides, and spreads fourth light transmitted through the output waveguides so as to output the fourth light into the phase-difference waveguides. The optical switch unit arbitrarily selects different optical signals in an identical wavelength band in a pair of adjacent ones of the output waveguides, and performs 2×2 switching of the different optical signals so that the switched optical signals are outputted from the at least two input waveguides.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention are explained in detail below with reference to drawings.

Principle of the Invention

Figure 1:
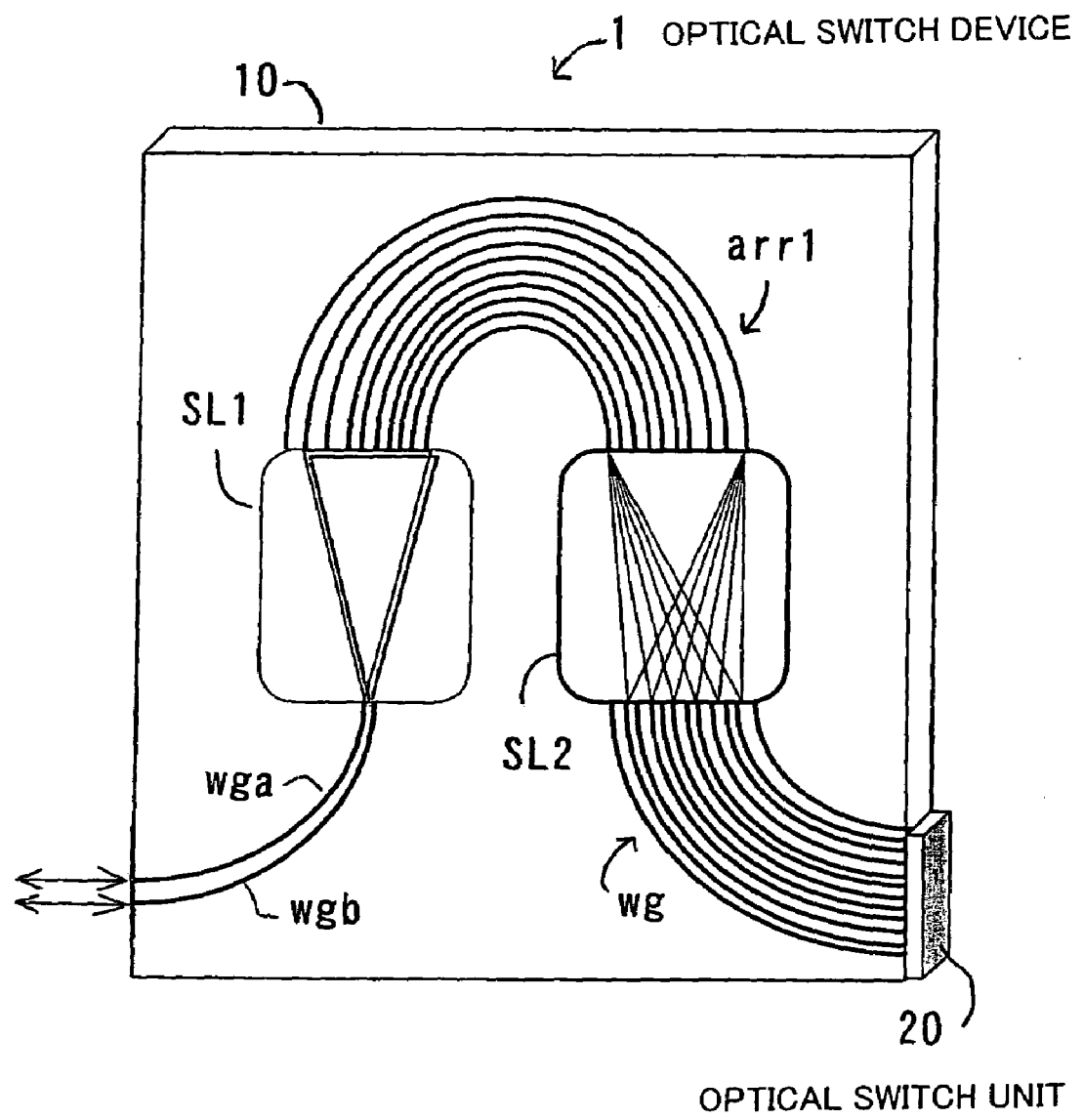
FIG. 1 is a diagram illustrating the principle of the optical switch device according to the present invention.

FIG. 1 is a diagram illustrating the principle of the optical switch device according to the present invention. The optical switch device 1 comprises an AWG (array waveguide grating) 10 and an optical switch unit 20, and performs switching of WDM signals by selecting wavelengths of the WDM signals.

The AWG 10 comprises, as optical waveguides, input waveguides wga and wgb, phase-difference waveguides arr1, first and second slab waveguides SL1 and SL2, and output waveguides wg. Such optical waveguides are formed, for example, on a $SiO_2$ layer formed on a Si substrate. The output waveguides wg are arranged with such a pitch that the split wavelength gap (i.e., the gap between wavelengths which can be split by the AWG) is equal to or smaller than half of the gap between the operating wavelengths of the WDM signals. The input waveguides wga and wgb are also arranged with the same pitch as the output waveguides wg.

The respective phase-difference waveguides arr1 have different lengths so as to make optical path differences between portions of light which respectively propagate through the phase-difference waveguides arr1. In addition, the slab waveguides SL1 and SL2 are optical waveguides arranged in such a manner that propagation light is confined in a region having a high refraction index and a shape of a thin film.

The first slab waveguide SL1 spreads first light which is transmitted from the input waveguides wga and wgb so as to output the first light into the phase-difference waveguides arr1. In addition, the first slab waveguide SL1 condenses second light which is transmitted from the phase-difference waveguides arr1 so as to output the second light into the input waveguides wga and wgb.

The second slab waveguide SL2 spreads third light which is transmitted from the output waveguides wg so as to output the third light into the phase-difference waveguides arr1. In addition, the second slab waveguide SL2 condenses fourth light which is transmitted from the phase-difference waveguides arr1, for each of a plurality of wavelength components of the fourth light so as to separately output the plurality of wavelength components of the fourth light into the output waveguides wg in such a manner that predetermined ones of the plurality of wavelength components of the fourth light are split and separately inputted into predetermined ones of the output waveguides wg which are one or more waveguides apart, and other predetermined ones of the plurality of wavelength components of the fourth light are also split and separately inputted into other predetermined ones of the output waveguides wg which are also one or more waveguides apart.

The optical switch unit 20 performs 2×2 switching of optical signals in each wavelength band which propagate in a pair of adjacent ones of the output waveguides wg, and returns the switched optical signals so as to be finally outputted from the input waveguides wga and wgb.

Figure 2:
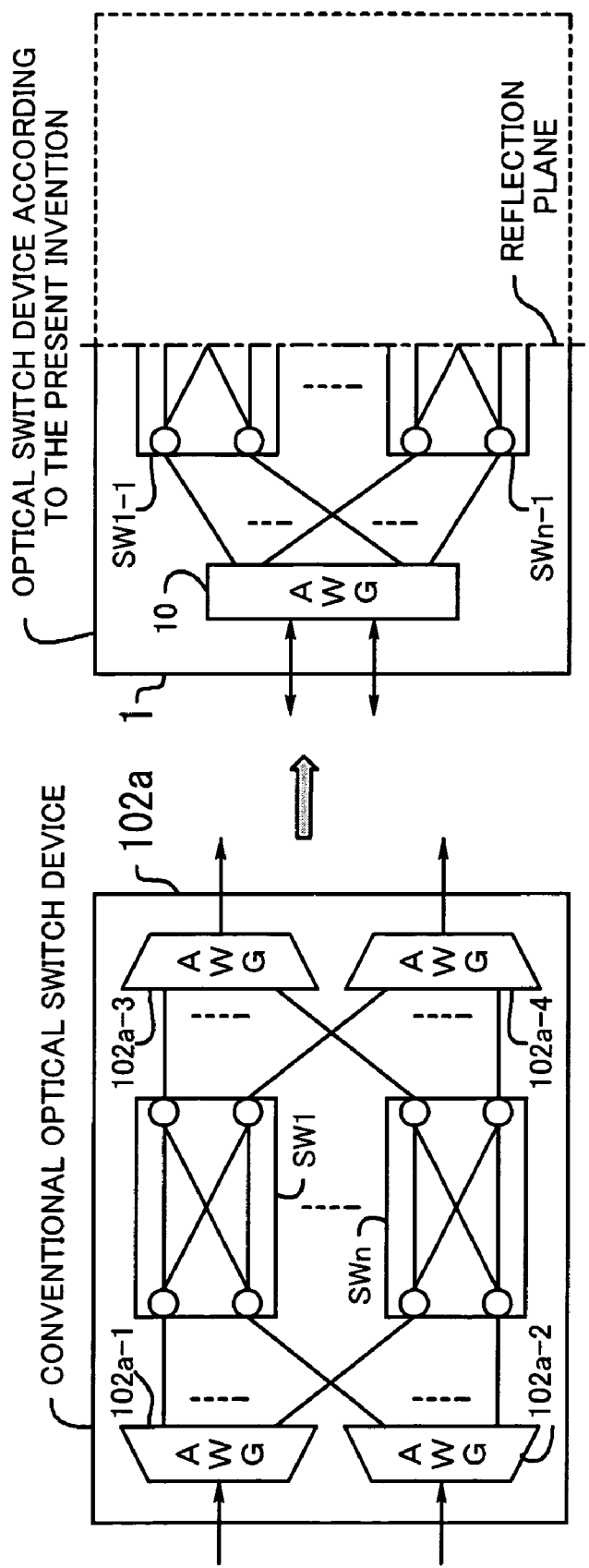
FIG. 2 is a diagram schematically illustrating the difference between a conventional wavelength-selective switch and the wavelength-selective switch according to the present invention.

FIG. 2 is a diagram schematically illustrating the difference between a conventional wavelength-selective switch and the wavelength-selective switch according to the present invention.

As illustrated in FIG. 2, the conventional optical switch unit 102a, which performs wavelength-selective switching for connection to two different fiber routes, needs two AWGs each of which splits light into n wavelength components, n 2×2 switches SW1 to SWn, and two AWGs each of which combines n wavelength components.

On the other hand, the optical switch device 1 according to the present invention, which realizes the same switching function as the optical switch unit 102a, comprises a single AWG 10 and an optical switch unit 20, where the AWG 10 splits light into 2n wavelength components and combines 2n wavelength components, and the optical switch unit 20 corresponds to the switches SW1-1 to SWn-1 and makes optical signals reflected at the reflection plane illustrated by the alternate long and short dash line in FIG. 2. Details of the construction of the optical switch unit 20 are explained later.

That is, according to the present invention, a reflection-type AWG, which realizes the functions of the four AWGs and the n 2×2 switches SW1 to SWn, can be constituted by the AWG 10 and the optical switch unit 20. Thus, the functions of the four AWGs and the n 2×2 switches SW1 to SWn can be realized with a much smaller number of mounted elements in a much smaller mounting area. That is, the size and cost of the optical switch device can be reduced. Details of the construction and operations of the optical switch device according to the present invention are explained later with reference to FIGS. 5 to 17.

Figure 3:
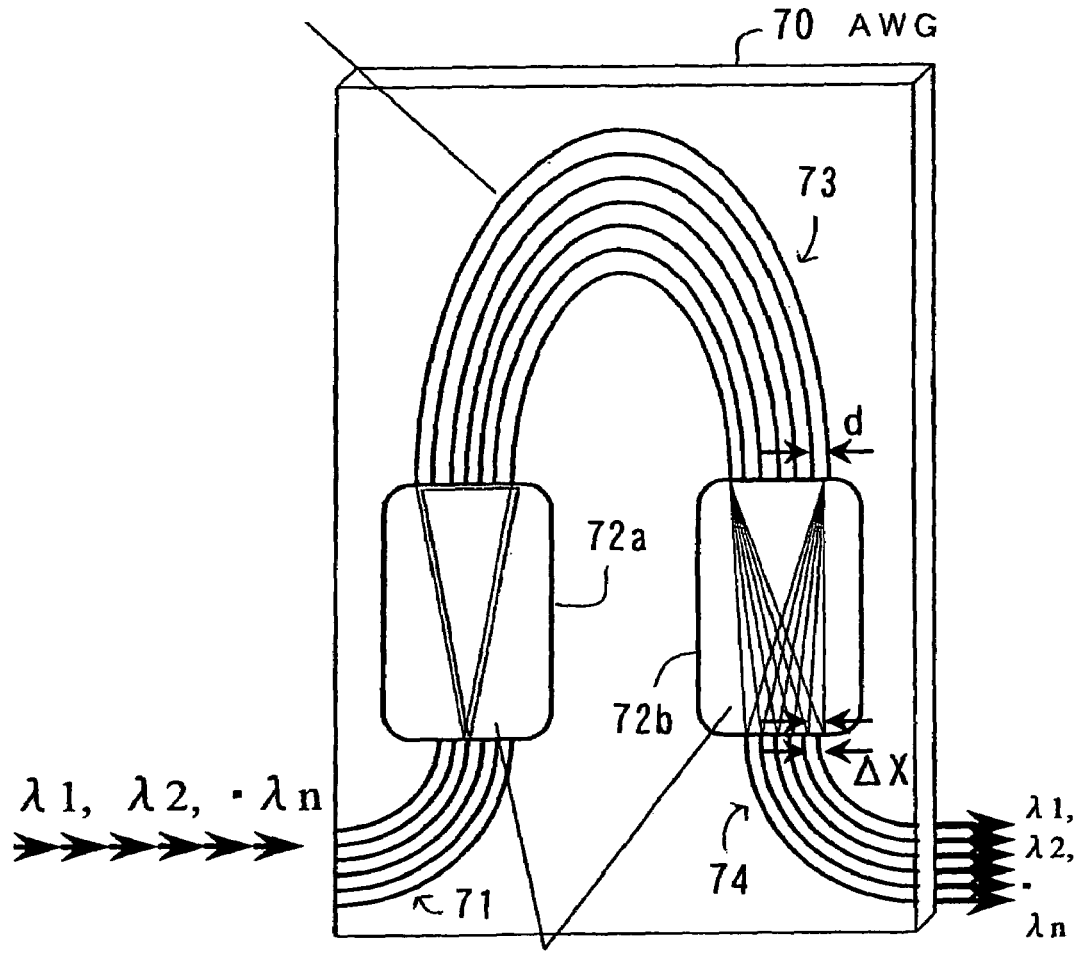
FIG. 3 is a diagram illustrating a construction of a general AWG.

Before details of the present invention are explained, the general features of the AWG are indicated below. FIG. 3 is a diagram illustrating a typical construction of a general AWG.

In the AWG 70, light which conveys a WDM signal having the wavelengths $\lambda 1$ to $\lambda n$ and is inputted from the input waveguides 71 spreads by diffraction in the slab waveguide 72a, and is split into portions so that the respective portions of the split light are delivered to the phase-difference waveguides 73. The phase-difference waveguides 73 have different lengths. Therefore, phase differences (optical path differences) are made among the portions of the split light when the portions of the split light propagate through the phase-difference waveguides 73 and reach the slab waveguide 72b.

In the case where the lengths of the phase-difference waveguides 73 are optimumly adjusted so that the phase-difference waveguides 73 as a whole exhibit characteristics similar to a grating (diffraction grating), i.e., the phase-difference waveguides 73 realize wavelength decomposition, the wavelength components of the light which passes through the phase-difference waveguides 73 condense at different positions depending on their wavelengths.

The portions of the light which are outputted from the phase-difference waveguides 73 realize at the light input end of the slab waveguide 72b a series of point light sources which emit light with different phases. The portions of the light spread by diffraction in the slab waveguide 72b, and the wavelength components of the light are intensified by interference in such a manner that the respective wavelength components are condensed in different ones of the output waveguides 74. Thus, the light conveying the WDM signal is split into the wavelength components in the output waveguides 74.

Reversely, when wavelengths components having different wavelengths are injected into the output waveguides 74, the wavelengths components are combined in a waveguide, and are then outputted.

Figure 4:
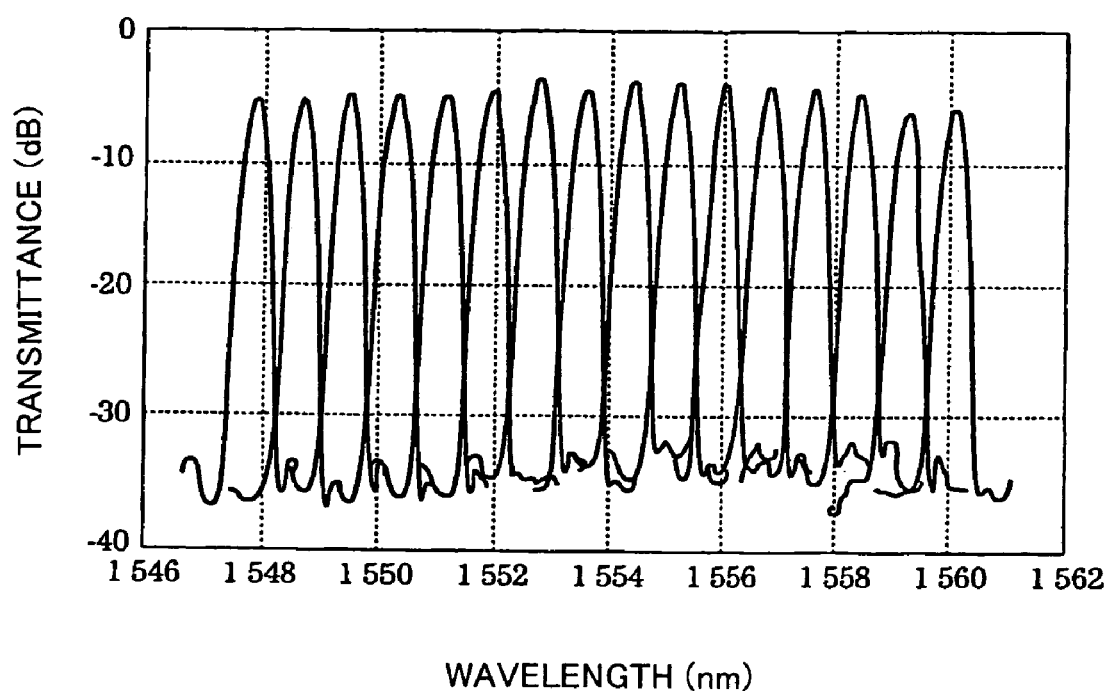
FIG. 4 is a diagram illustrating a transmission characteristic of an AWG.

FIG. 4 is a diagram illustrating a transmission characteristic of an AWG. Specifically, FIG. 4 shows examples of transmittances to respective output waveguides in a 16×16 AWG used for wavelength multiplexing. In FIG. 4, the ordinate corresponds to the transmittance (dB), and the abscissa corresponds to the wavelength (nm). Each of the output waveguides transmits light in only a specific wavelength band, and does not transmit light having the other wavelengths. The transmission band is a wavelength band including a transmittance peak, and called a channel. In the example of FIG. 4, the number of the channels is 16, and the wavelength gaps between transmission bands are arranged to be as small as 0.08 nm (corresponding to 10 GHz). At this time, the crosstalk is −30 dB or smaller.

The split wavelength gap $\Delta\lambda$ of the AWG (i.e., the gap between wavelengths which can be split by the AWG), which determines the wavelength resolution of the AWG, can be obtained by the formula, $$\Delta\lambda = ns \cdot d \cdot nc \cdot \Delta X/f \cdot (nc \cdot \Delta L/\lambda 0) \cdot ng, \quad (1)$$

where ns is the effective refraction index of the slab waveguides, f is the focal length of the slab waveguides, nc is the effective refraction index of the phase-difference waveguides, ng is the group index of the phase-difference waveguides, $\Delta L$ is the optical path difference in the phase-difference waveguides, d is the pitch of the phase-difference waveguides, $\Delta X$ is the pitch of the output waveguides, and $\lambda 0$ is the center wavelength of the phase-difference waveguides.

Since $\Delta\lambda$ is proportional to $\Delta X$ as indicated in the formula (1), the formula (1) can be simply written as $\Delta\lambda = k \cdot \Delta X$, where k is a constant. Therefore, when the parameters other than the pitch of the output waveguides $\Delta X$ are fixed, and the pitch of the output waveguides $\Delta X$ is controlled, it is possible to form an AWG having an arbitrary value of $\Delta\lambda$. That is, it is possible to change the split wavelength gap $\Delta\lambda$ (for example, to 10 nm or 50 nm) by controlling $\Delta X$ for splitting light into wavelength components.

Hereinbelow, the constructions and operations of the optical switch devices according to the present invention are explained in detail.

First Embodiment

Figure 5:
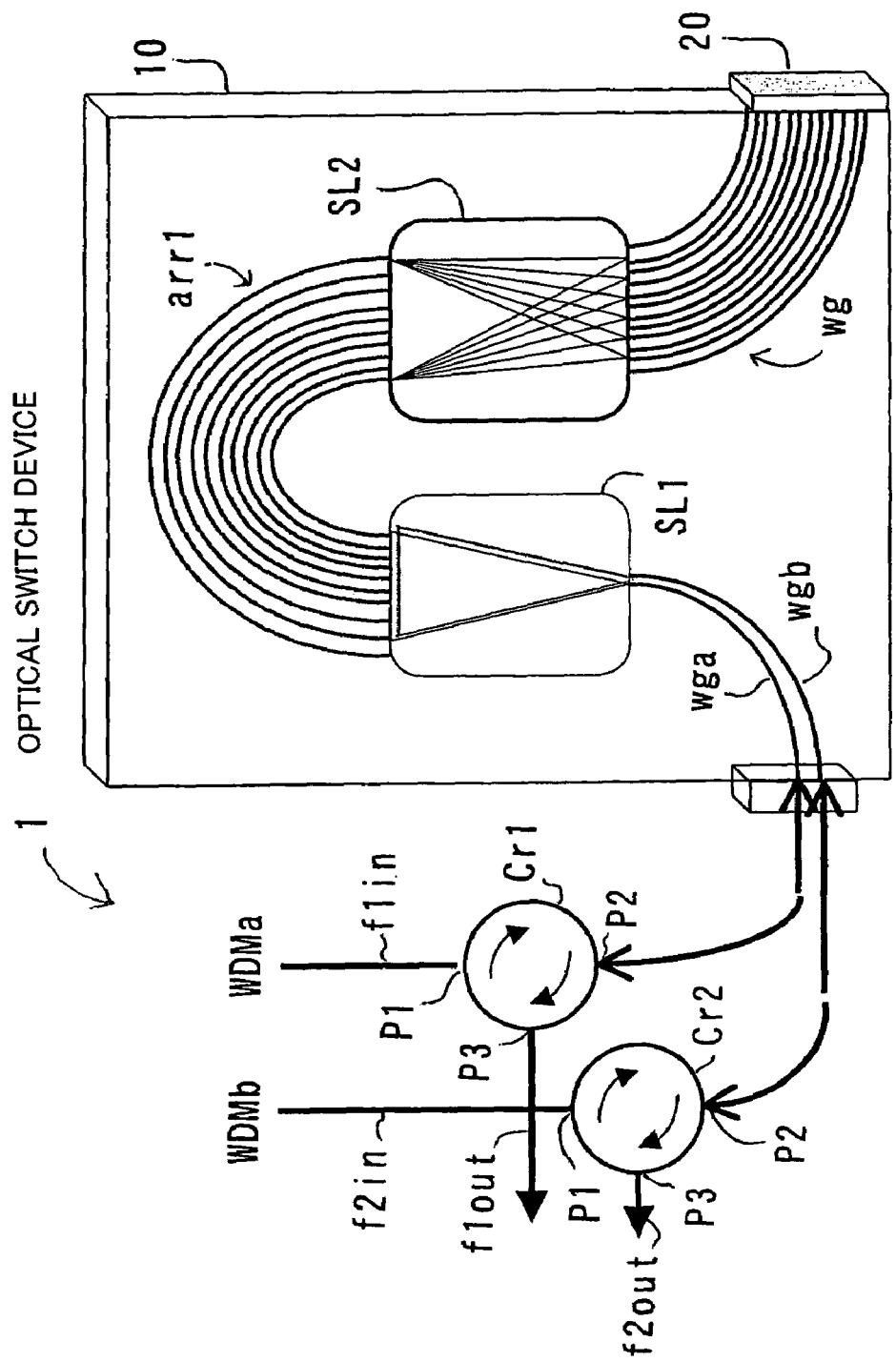
FIG. 5 is a diagram illustrating a construction of an optical switch device according to a first embodiment of the present invention.

FIG. 5 is a diagram illustrating the construction of the optical switch device 1 according to the first embodiment of the present invention. The optical switch device 1 comprises an AWG 10, an optical switch unit 20, and optical circulators Cr1 and Cr2, and performs switching of wavelength components of inputted WDM signals WDMa and WDMb at each wavelength.

The optical circulators Cr1 and Cr2 each have a circular structure with three ports. The optical circulator Cr1 receives a first optical signal from the input fiber f1in at the port P1, and outputs the first optical signal (as an optical signal in the first route) from the port P2 to the input waveguide wga. In addition, the optical circulator Cr1 receives a second optical signal from the input waveguide wga at the port P2, and outputs the second optical signal from the port P3 to the output fiber f1out.

The optical circulator Cr2 receives a third optical signal from the input fiber f2 in at the port P1, and outputs the third optical signal (as an optical signal in the second route) from the port P2 to the input waveguide wgb. In addition, the optical circulator Cr2 receives a fourth optical signal from the input waveguide wgb at the port P2, and outputs the fourth optical signal from the port P3 to the output fiber f2out.

The AWG 10 comprises the input waveguides wga and wgb, slab waveguides SL1 and SL2, phase-difference waveguides arr1, and output waveguides wg, which are formed, for example, on a $SiO_2$ layer formed on a Si substrate. The output waveguides wg are arranged with a pitch which corresponds to a wavelength gap equal to or smaller than half of the gap between the operating wavelengths of the WDM signals.

For example, in the case where wavelengths spaced 100 nm apart are multiplexed in each of the WDM signals WDMa and WDMb, the output waveguides wg are arranged by obtaining the pitch of the output waveguides wg from the formula (1) under the condition that the split wavelength gap $\Delta\lambda$ of the optical waveguides becomes 50 nm.

In the case where n wavelengths are multiplexed in the WDM signals WDMa and WDMb, the number of the output waveguides wg should be 2n. For example, in the case where 16 wavelengths are multiplexed in each of the WDM signals WDMa and WDMb, the number of the output waveguides wg should be 32.

In this embodiment, the number of the input waveguides wga and wgb is two, which is equal to the number of the inputted WDM signals. The input waveguides wga and wgb are spaced with a pitch identical to the pitch of the output waveguides wg. For example, in the case where the pitch of the output waveguides wg is $\Delta X1$ in correspondence with the split wavelength gap $\Delta\lambda$ of 50 nm, the pitch of the input waveguides wga and wgb is also $\Delta X1$.

In the case where the input waveguides wga and wgb and the output waveguides wg are arranged as above, the wavelength components of light inputted from each of the input waveguides wga and wgb can be separated in such a manner that the wavelength components are inputted into predetermined ones of the output waveguides wg which are one or more waveguides apart.

That is, wavelength-division multiplexed light inputted from the input waveguide wga spreads in the slab waveguide SL1 and is finely split into portions so that the portions of the wavelength-division multiplexed light propagate through the phase-difference waveguides arr1, and realize at the light input end of the slab waveguide SL2 a series of point light sources which emit light with different phases. Since the portions of the light emitted from the series of point light sources interfere, the wavelength components of the wavelength-division multiplexed light inputted from the input waveguide wga are intensified and condensed in different directions depending on their wavelengths, and enter, for example, the odd-numbered ones wg1, wg3, . . . wg2n-1 of the output waveguides wg. That is, the wavelength-division multiplexed light inputted from the input waveguide wga is split into their wavelength components.

Similarly, wavelength-division multiplexed light inputted from the input waveguide wgb spreads in the slab waveguide SL1 and is finely split into portions so that the portions of the wavelength-division multiplexed light propagate through the phase-difference waveguides arr1, and realize at the light input end of the slab waveguide SL2 another series of point light sources which emit light with different phases. However, since, in this case, the wavelength-division multiplexed light from the input waveguide wgb is inputted into the slab waveguide SL1 from the different position from the input waveguide wga, the wavelength components of the wavelength-division multiplexed light inputted from the input waveguide wgb enter the even-numbered ones wg2, wg4, . . . , wg2n of the output waveguides wg. That is, the wavelength-division multiplexed light inputted from the input waveguide wgb is also split into their wavelength components.

Figure 6:
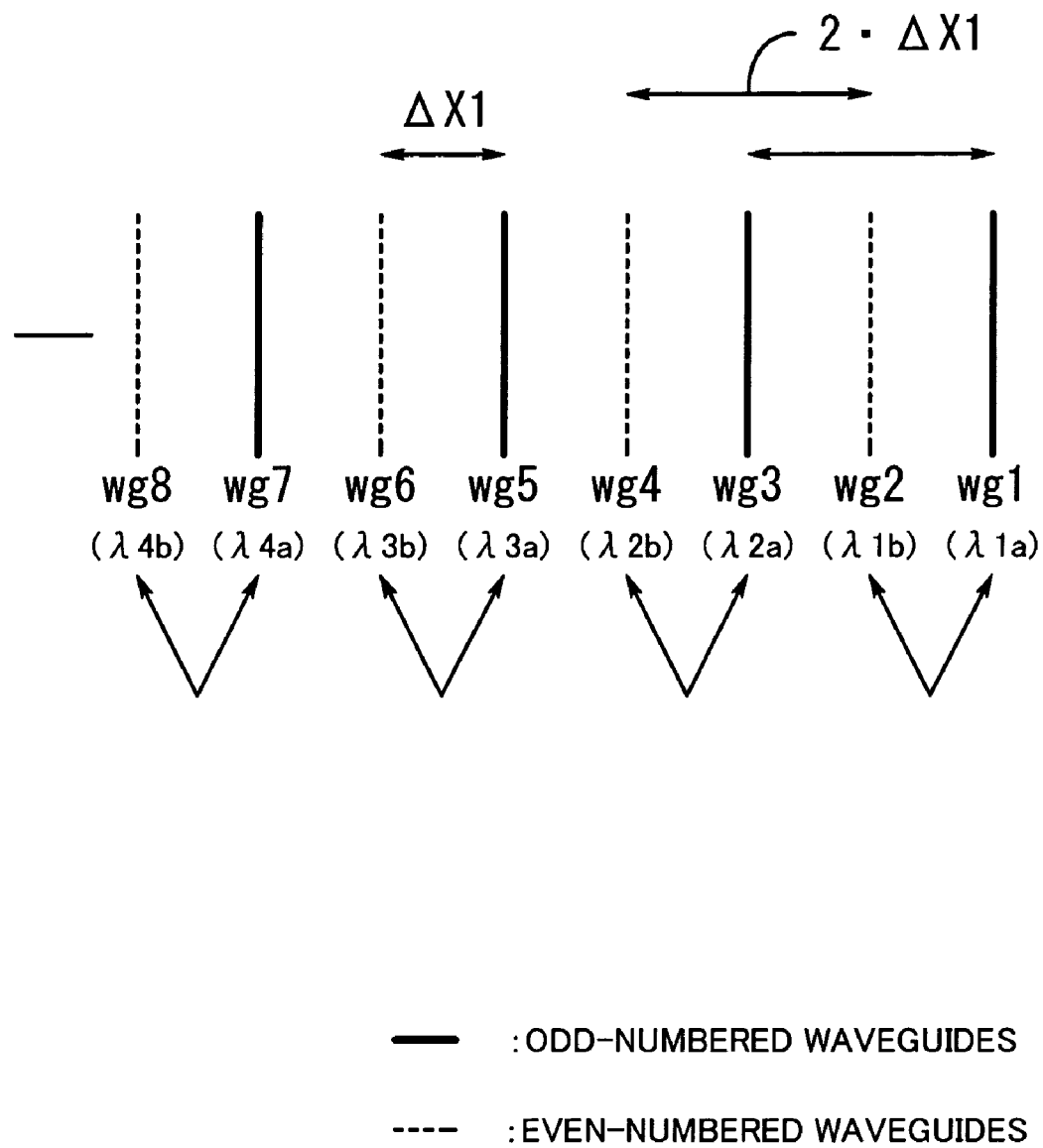
FIG. 6 is a diagram illustrating the states of output waveguides.

FIG. 6 is a diagram illustrating the states of the output waveguides wg. As indicated in FIG. 6, the output waveguides in which wavelength components split from the WDM signal WDMa propagate (i.e., the odd-numbered output waveguides) and the output waveguides in which wavelength components split from the WDM signal WDMb propagate (i.e., the even-numbered output waveguides) are alternately located. When the pitch of the output waveguides wg including the odd-numbered output waveguides and the even-numbered output waveguides is denoted by ΔX1, the pitch of the odd-numbered output waveguides and the pitch of the even-numbered output waveguides are each 2ΔX1, and the gap between an odd- numbered output waveguide and an even-numbered output waveguide which are located adjacent to each other is ΔX1. For example, when the wavelengths are multiplexed with a wavelength gap of 100 nm in each of the WDM signals WDMa and WDMb, and the split wavelength gap Δλ of the output waveguides wg is 50 nm, the pitch 2ΔX1 of the odd-numbered output waveguides and the pitch 2ΔX1 of the even-numbered output waveguides each correspond to a wavelength gap of 100 nm, although the gap ΔX1 between an odd-numbered output waveguide and an even-numbered output waveguide adjacent to each other corresponds to a wavelength gap of 50 nm.

In addition, wavelength components of different WDM signals (e.g., the WDM signals WDMa and WDMb) in each wavelength band propagate through a pair of an odd-numbered output waveguide and an even-numbered output waveguide which are located adjacent to each other. For example, when a wavelength component λ1a having a wavelength of 1,550 n=and being split from the WDM signal WDMa propagates through the output waveguide wg1, a wavelength component λ1b having the same wavelength of 1,550 nm and being split from the WDM signal WDMb propagates through the adjacent output waveguide wg2.

Referring back to FIG. 5, the optical switch unit 20 is arranged at ends of the output waveguides wg in the AWG 10, and performs an operation of 2×2 switching of optical signals in each wavelength band which propagate in a pair of adjacent ones of the output waveguides wg, and returns the switched optical signals by using total reflection so that the switched optical signals are finally outputted from the input waveguides wga and wgb.

That is, the optical switch unit 20 performs switching of optical signals having an identical wavelength and being respectively split from the light inputted from the input waveguides wga and wgb, between an odd-numbered output waveguide and an even-numbered output waveguide. At this time, optical signals which have an identical wavelength and are switched from an odd-numbered output waveguide to an even-numbered output waveguide are returned after reflection through a return optical path containing the even-numbered output waveguide, and outputted from the input waveguide wgb. Then, the returned optical signals enter the optical circulator Cr2 from the port P2, and are outputted from the port P3 into the output fiber f2out. In addition, optical signals which have an identical wavelength and are switched from an even-numbered output waveguide to an odd-numbered output waveguide are returned after reflection through a return optical path containing the odd-numbered output waveguide, and outputted from the input waveguide wga. Then, the returned optical signals enter the optical circulator Cr1 from the port P2, and are outputted from the port P3 into the output fiber f1out. Further, it is possible to arbitrarily set at least one wavelength at which optical signals are to be exchanged, or at least one wavelength at which optical signals are not to be exchanged.

For example, assume that the AWG 10 splits an optical signal having a wavelength λ1a from a WDM signal WDMa transmitted from the input fiber f1in and an optical signal having a wavelength λ1b from a WDM signal WDMb transmitted from the input fiber f2 in so that the optical signal having the wavelength λ1a propagates through the odd-numbered output waveguide wg1 and the optical signal having the wavelength λ1b propagates through the even-numbered output waveguide wg2.

At this time, when the optical switch unit 20 exchanges the optical signal having the wavelength λ1a and the optical signal having the wavelength λ1b, the optical signal having the wavelength λ1a propagates through the route from the input waveguide wgb to the even-numbered output waveguide wg2 in the reverse direction, and is outputted from the input waveguide wgb. Then, the optical signal having the wavelength λ1a is outputted through the optical circulator Cr2 into the output fiber f2out.

In parallel with the propagation of the optical signal having the wavelength λ1a, the optical signal having the wavelength λ1b propagates through the route from the input waveguide wga to the odd-numbered output waveguide wg1 in the reverse direction, and is outputted from the input waveguide wga. Then, the optical signal having the wavelength λ1b is outputted through the optical circulator Cr1 into the output fiber f1out.

On the other hand, when the optical switch unit 20 does not exchange the optical signal having the wavelength λ1a and the optical signal having the wavelength λ1b, each of the optical signal having the wavelength λ1a and the optical signal having the wavelength λ1b is returned from the optical switch unit 20 through the route through which the optical signal propagates to the optical switch unit 20, in the reverse direction. That is, the optical signal inputted from the input waveguide wga is returned to and outputted from the input waveguide wga, and the optical signal inputted from the input waveguide wgb is returned to and outputted from the input waveguide wgb.

Figure 7:
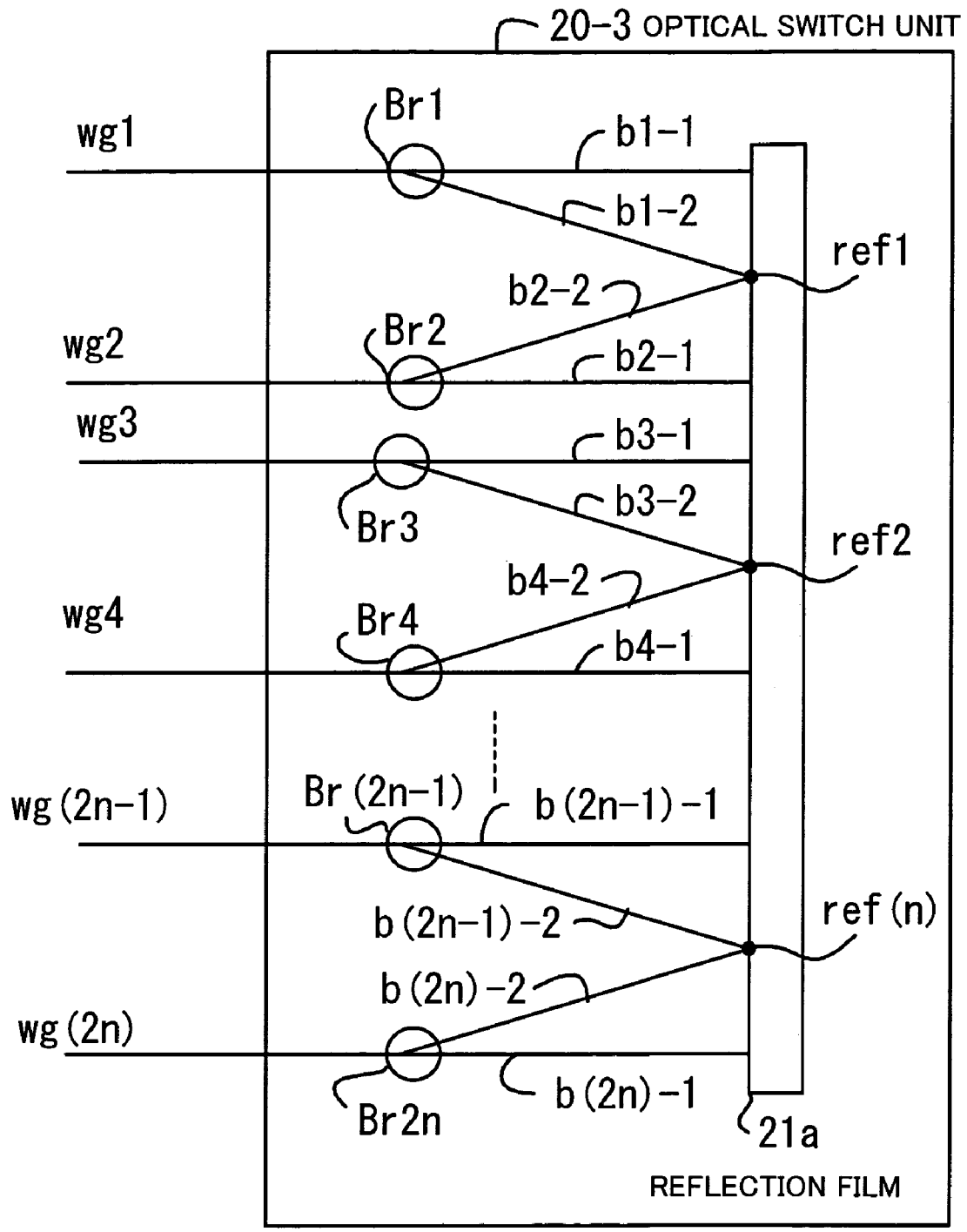
FIG. 7 is a diagram illustrating a construction of an optical switch unit in the first embodiment.

Next, the construction of the optical switch unit 20 is explained below. FIG. 7 is a diagram illustrating a construction of an optical switch unit used in the first embodiment. The optical switch unit 20-3 comprises branch units Br1, Br2, . . . , Br2n, branch waveguides b1-1, b3-1, . . . , b(2n-1)-1, branch waveguides b1-2, b3-2, . . . , b(2n-1)-2, branch waveguides b2-2, b4-2, . . . , b(2n)-2, branch waveguides b2-1, b4-1, . . . b(2n)-1, and a reflection film 21a.

The branch units Br1, Br2, . . . , Br2n are arranged on the output waveguides wg1, wg2, . . . , wg(2n-1), wg(2n), respectively. All the above branch waveguides are connected to the reflection film 21a. At this time, the branch waveguides b(2i-1)-2 and b(2i)-2 are connected at the reflection spot ref(i) on the reflection film 21a, where 1≦i≦n.

Next, the operations of the optical switch unit 20 are explained below by taking as an example a case where switching is performed between the odd-numbered waveguide wg1 and the even-numbered waveguide wg2.

The optical path of light which is transmitted through the odd-numbered waveguide wg1 is switched at the branch unit Br1 to the branch waveguide b1-1 or the branch waveguide b1-2. When the light is switched to the branch waveguide b1-1, the light is reflected by the reflection film 21a, and propagates through the branch waveguide b1-1 in the reverse direction to the odd-numbered waveguide wg1. On the other hand, when the light is switched to the branch waveguide b1-2, the light is reflected at the reflection spot ref1 on the reflection film 21a, and propagates through the branch waveguide b2-2 to the odd-numbered waveguide wg2.

In addition, the optical path of light which is transmitted through the even-numbered waveguide wg2 is switched at the branch unit Br2 to the branch waveguide b2-2 or the branch waveguide b2-1. In similar manners to the light which is transmitted through the odd-numbered waveguide wg1, when the light which is transmitted through the even-numbered waveguide wg2 is switched to the branch waveguide b2-2, the light propagates to the odd-numbered waveguide wg1. On the other hand, when the light is switched to the branch waveguide b2-1, the light propagates to the even-numbered waveguide wg2.

Figure 8:
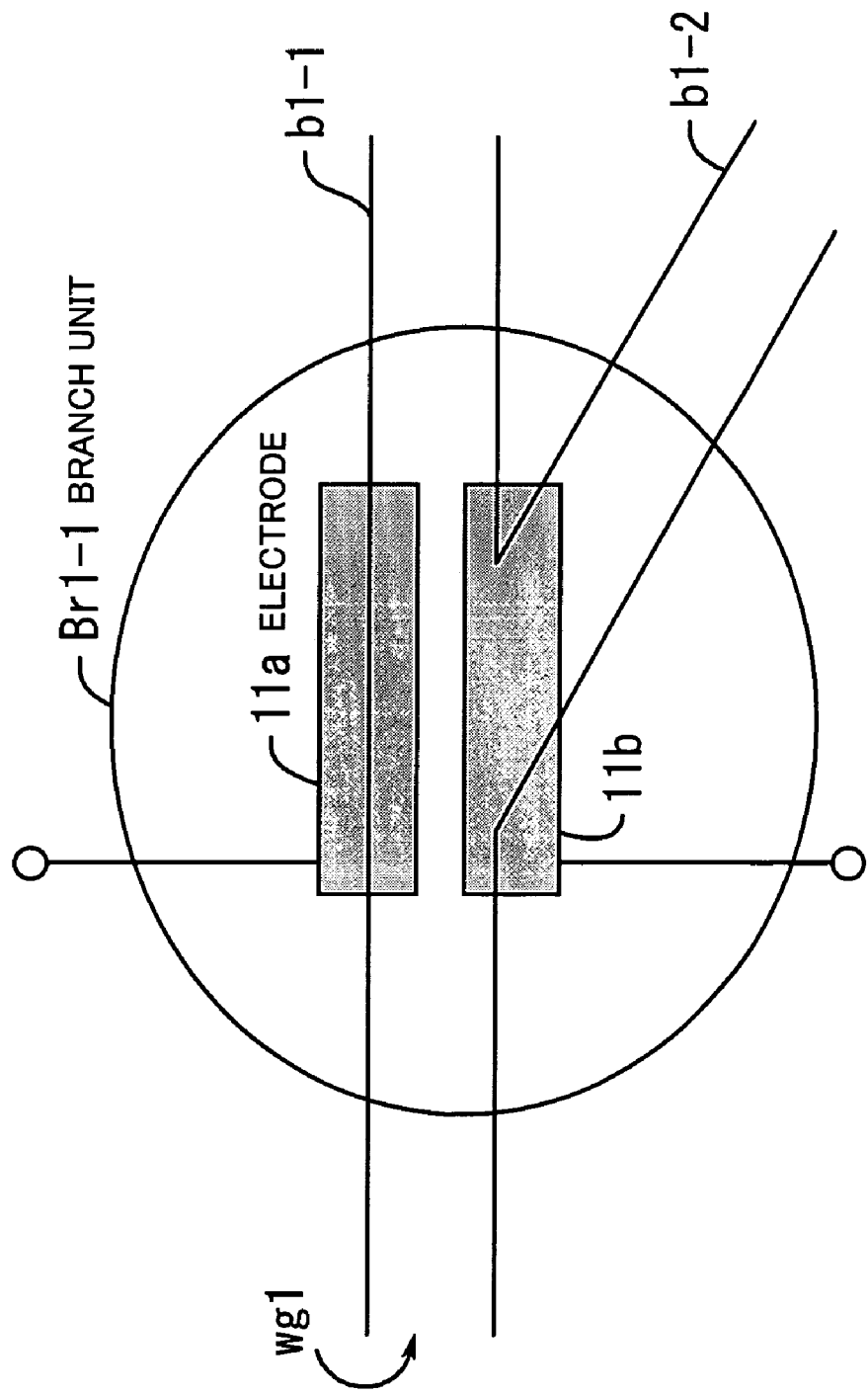
FIG. 8 is a diagram schematically illustrating a first example of a branch unit.

FIG. 8 is a diagram schematically illustrating a first example of a branch unit. In the branch unit Br1-1 illustrated in FIG. 8, electrodes 11a and 11b are arranged on a waveguide, and change a refraction index by a thermo-optic effect or an electro-optic effect so as to switch the branch path. Thus, switching of an optical path is realized. For example, when no electric voltage is applied between the electrodes 11a and 11b, the light which is transmitted from the odd-numbered waveguide wg1 is switched to the branch waveguide b1-1. On the other hand, when an electric voltage +V is applied to the electrode 11b while the electrode 11a is grounded, the light which is transmitted from the odd-numbered waveguide wg1 is switched to the branch waveguide b1-2.

Figure 9:
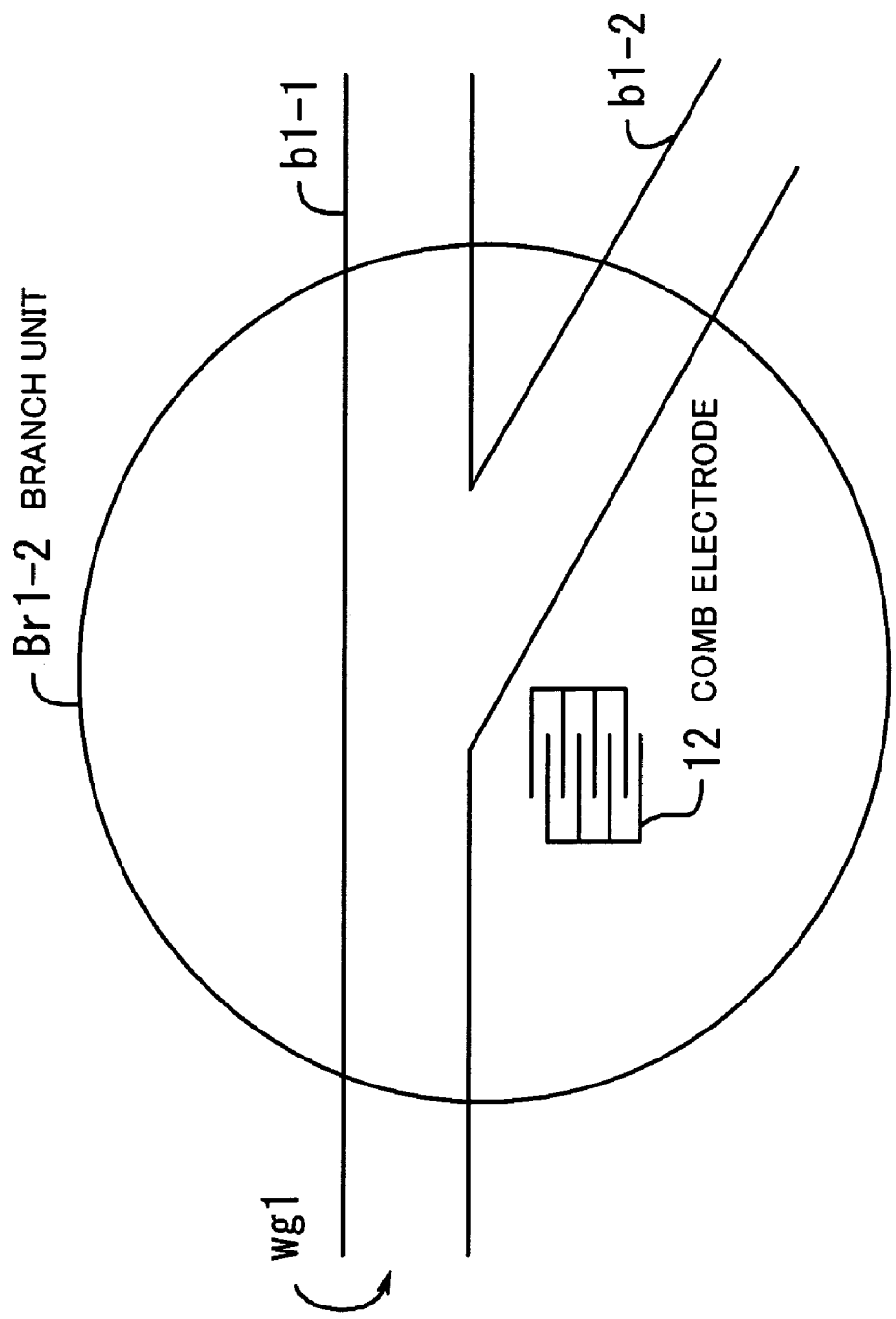
FIG. 9 is a diagram schematically illustrating a second example of the branch unit.

FIG. 9 is a diagram schematically illustrating a second example of a branch unit. In the branch unit Br1-2 illustrated in FIG. 9, the branch path is switched by using an acoustoptic effect. Specifically, comb electrodes 12 are arranged for generating a surface acoustic wave. For example, when no electric voltage is applied between the comb electrodes 12, the light which is transmitted from the odd-numbered waveguide wg1 is switched to the branch waveguide b1-1. On the other hand, when an electric voltage is applied to the comb electrodes 12, the light which is transmitted from the odd-numbered waveguide wg1 is switched to the branch waveguide b1-2 by diffraction caused by interaction between the surface acoustic wave and the light.

Figure 10:
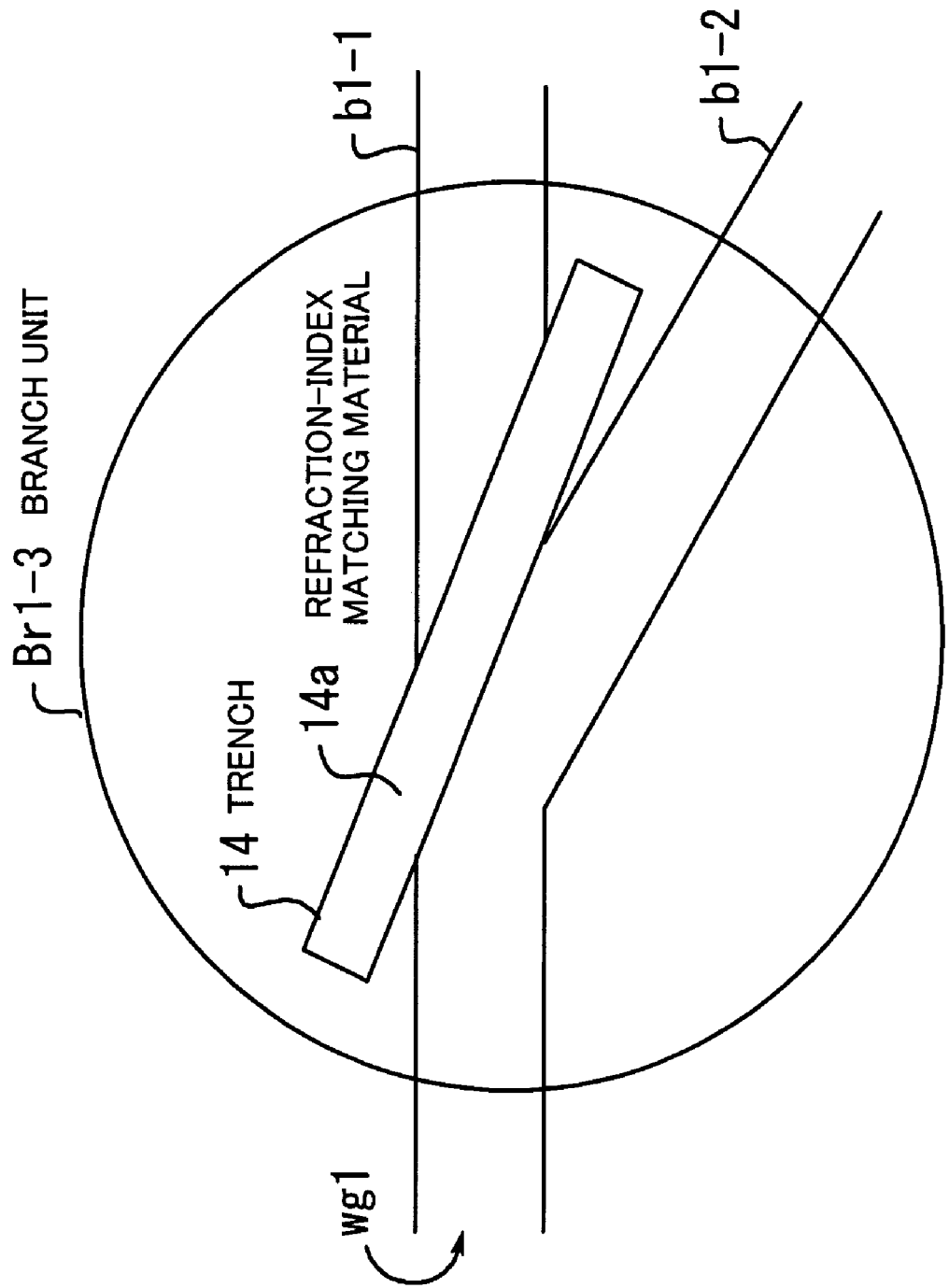
FIG. 10 is a diagram schematically illustrating a third example of the branch unit.

FIG. 10 is a diagram schematically illustrating a third example of a branch unit. In the branch unit Br1-3 illustrated in FIG. 10, a trench 14 is formed in a region in which light is branched, and filled with a refraction-index matching material 14a. When the refraction-index matching material 14a is not heated to vaporize the refraction-index matching material 14a, the light which is transmitted from the odd-numbered waveguide wg1 is switched to the branch waveguide b1-1. On the other hand, when the refraction-index matching material 14a is heated to vaporize the refraction-index matching material 14a, the difference in the refraction index between the trench 14 and the waveguides is increased by a film-boiling phenomenon, so that the light which is transmitted from the odd-numbered waveguide wg1 is totally reflected to the branch waveguide b1-2.

As explained above, according to the present invention, optical signals at each wavelength can be selectively switched to one of two optical paths by switching an optical path of the reflected light for each wavelength. Therefore, the function of the wavelength selection switch can be realized in a small size at low cost by forming a single AWG 10 and an optical switch unit 20 (realized by a switch array) on a PLC (planar light circuit), or connecting a single AWG 10 and an optical switch unit 20 which are separately formed.

Hereinbelow, a process for producing the optical switch device 1 according to the present invention is explained below. Optical waveguide devices such as AWGs can be formed on a silica-based PLC, which is highly reliable, and quartz is a typical example of silica. The processes for producing such optical waveguide devices are well known.

In addition, when the optical waveguide devices such as AWGs are produced by using polymer materials such as fluoropolyimide, switching can be achieved with power consumption which is less than the power consumption in the silica-based PLCs by an order of magnitude. Typically, the power consumption is 180 mW in the case of glass, and 18 mW in the case of a polymer material. Therefore, in the case where the optical switch device 1 according to the present invention is formed of polymer materials, it is possible to reduce the range of temperature control of the AWG 10.

Further, in the case where electro-optic crystal materials such as $LiNbO_3$ are used, it is possible to utilize the phase difference made by an electro-optic effect, instead of the phase difference made by the thermo-optic effect as above. Even when the electro-optic crystal materials are used, the performance of the optical switch device 1 is almost identical to the case where the thermo-optic effect is used. Alternatively, it is also possible to use organic materials having necessary electro-optic characteristics.

Furthermore, the optical switch device 1 can be formed by separately producing the AWG 10 and the optical switch unit 20, and coupling the optical switch unit 20 to the AWG 10. In this case, it is possible to choose a material having a superior characteristic for each part of the optical switch device 1. For example, it is possible to form the AWG 10 in a PLC of silica glass, and the optical switch unit 20 of fluoropolyimide, since the AWG 10 requires high reliability, and the optical switch unit 20 utilizes the thermo-optic effect and requires low power consumption. Since the thermo-optic coefficient of fluoropolyimide is ten times greater than the thermo-optic coefficient of glass, the power consumption needed for switching an optical path is reduced one tenth.

Second Embodiment

Hereinbelow, an optical switch device according to the second embodiment is explained with reference to FIGS. 11 and 12.

Figure 11:
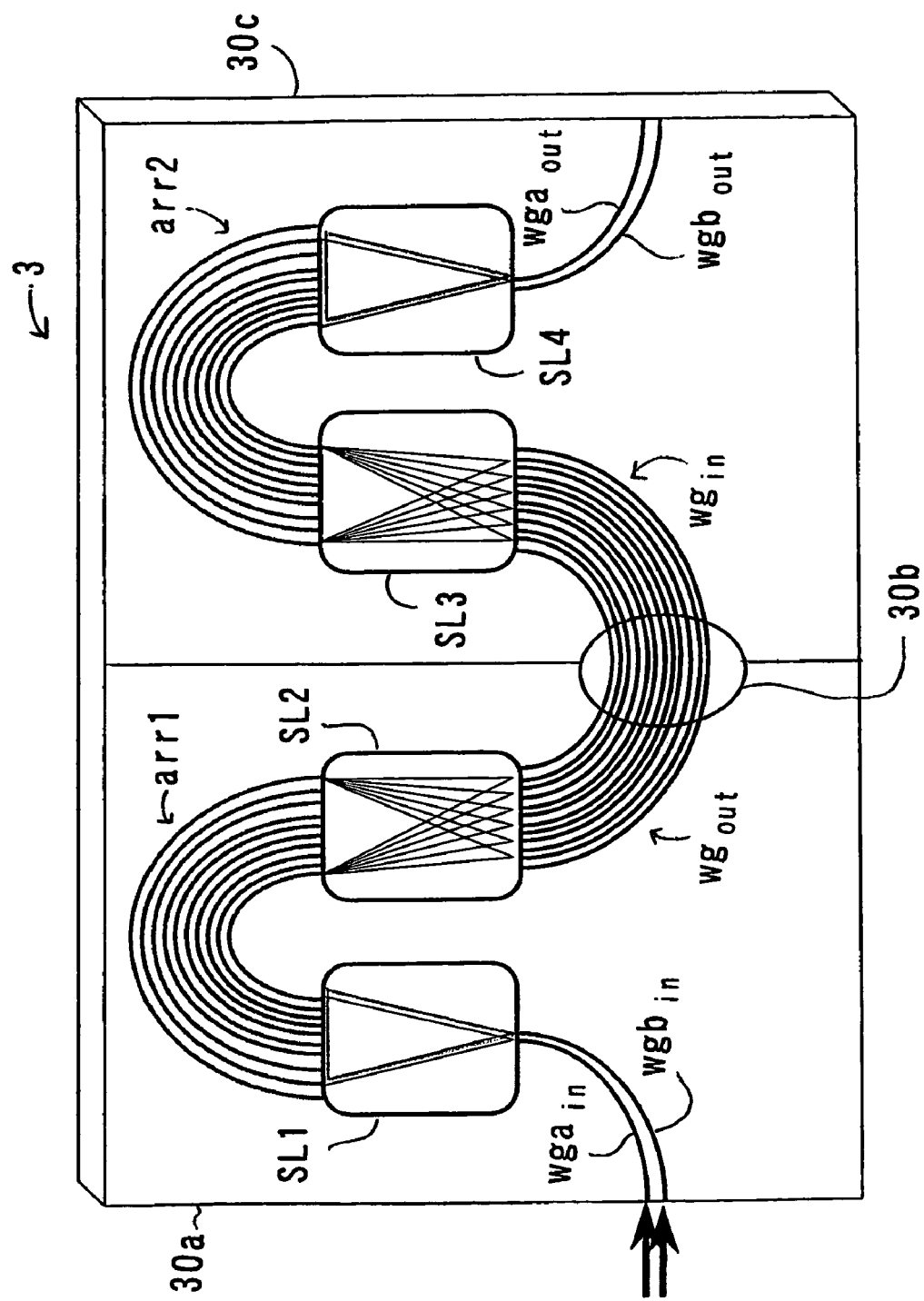
FIG. 11 is a diagram illustrating a construction of an optical switch device according to a second embodiment of the present invention.

FIG. 11 is a diagram illustrating a construction of the optical switch device according to the second embodiment. Although the optical switch device 1 according to the first embodiment is a reflection-type AWG (array waveguide grating), the optical switch device 3 according to the second embodiment is a transmission-type AWG constituted by a splitting-side AWG and a combining-side AWG which is arranged in the stage following the splitting-side AWG. In the optical switch device 3, switched optical signals are not reflected, and are transmitted through the combining-side AWG.

The optical switch device 3 comprises an AWG 30a, an optical switch unit 30b, and an AWG 30c, where the AWG 30a is identical to the AWG 10 in the first embodiment. For example, the AWG 30a, the optical switch unit 30b, and the AWG 30c are formed on a $SiO_2$ layer formed on a Si substrate.

The AWG 30a comprises, as optical waveguides, input waveguides $wga_{in}$ and $wgb_{in}$, first and second slab waveguides SL1 and SL2, phase-difference waveguides arr1, and output waveguides $wg_{out}$. The AWG 30c comprises, as optical waveguides, input waveguides $wg_{in}$, third and fourth slab waveguides SL3 and SL4, phase-difference waveguides arr2, and output waveguides wga$_{out}$ and wgb$_{out}$. The number and pitch of the input waveguides wg$_{in}$ in the AWG 30c are respectively identical to the number and pitch of the output waveguides wg$_{out}$ in the AWG 30a. The numbers of the output waveguides wga$_{out}$ and wgb$_{out}$ in the AWG 30c are respectively identical to the numbers of the input waveguides wga$_{in}$ and wgb$_{in}$ in the AWG 30a, and the pitch of the output waveguides wga$_{out}$ and wgb$_{out}$ in the AWG 30c is identical to the pitch of the output waveguides wg$_{out}$ in the AWG 30a.

Figure 12:
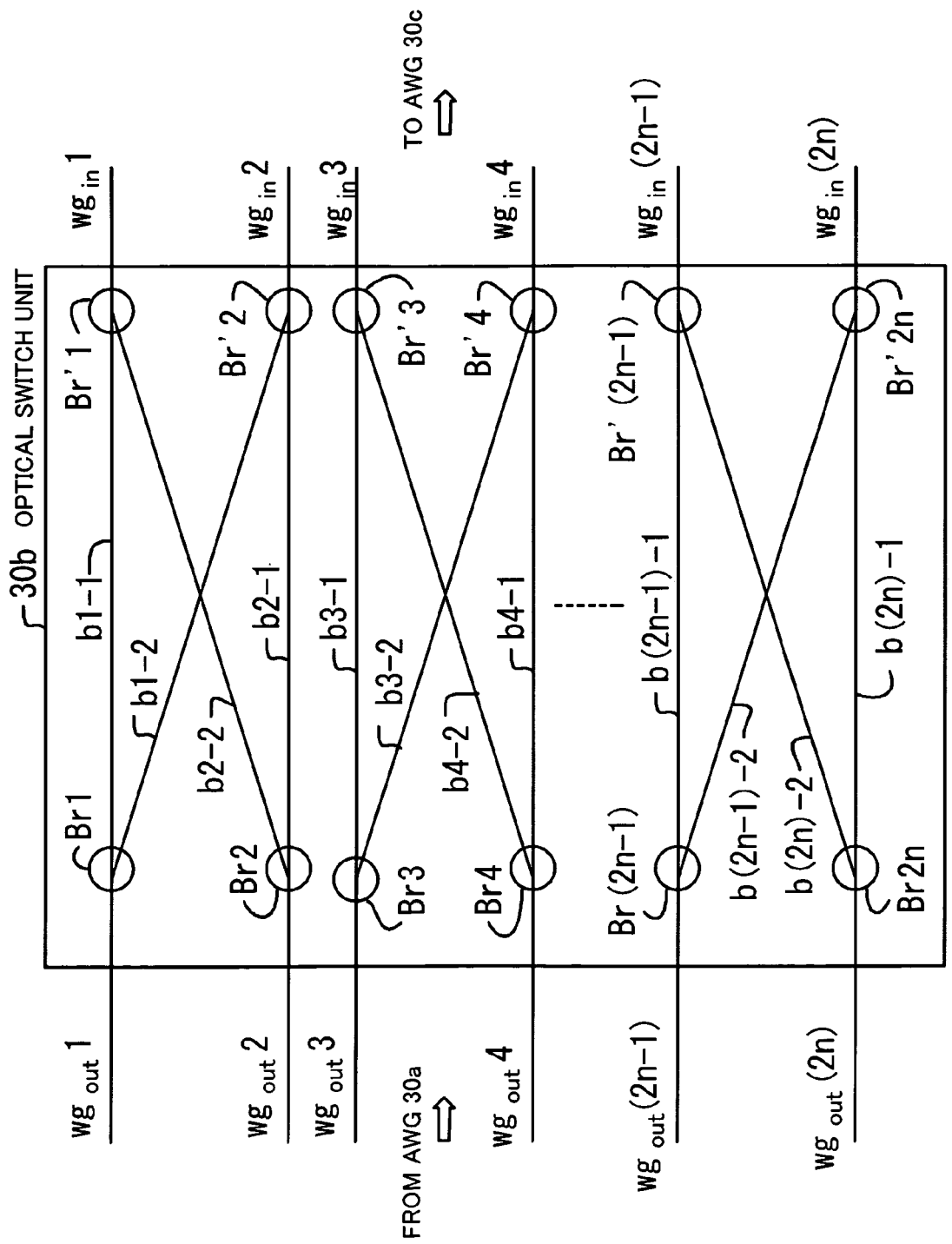
FIG. 12 is a diagram illustrating a construction of an optical switch unit in the second embodiment.

FIG. 12 is a diagram illustrating a construction of the optical switch unit 30b in the second embodiment.

The optical switch unit 30b comprises branch units Br1, Br2, ..., Br2n, Br'1, Br'2, ..., Br'2n, branch waveguides b1-1, b3-1, ..., b(2n-1)-1, branch waveguides b1-2, b3-2, ..., b(2n-1)-2, branch waveguides b2-2, b4-2, ..., b(2n)-2, and branch waveguides b2-1, b4-1, ..., b(2n)-1. As illustrated in FIG. 12, the optical switch unit 30b is different from the optical switch unit 20-3 in that the optical switch unit 30b does not have the reflection film 21a, and optical signals are not returned by using the reflection film 21a. In FIG. 12, the branch waveguides b1-2, b3-2, ..., b(2n-1)-2 are not connected with the branch waveguides b2-2, b4-2, ..., b(2n)-2.

The odd-numbered output waveguide wg$_{out}$(2i-1) in the AWG 30a is connected to the branch unit Br(2i-1), and the even-numbered output waveguide wg$_{out}$(2i) in the AWG 30a is connected to the branch unit Br(2i), where 1≦i≦n. In addition, the odd-numbered input waveguide wg$_{in}$ (2j-1) in the AWG 30c is connected to the branch unit Br'(2j-1), and the even-numbered input waveguide wg$_{in}$ (2j) in the AWG 30c is connected to the branch unit Br'(2j), where 1≦j≦n.

Alternatively, it is possible to separately produce the optical switch unit 30b and a substrate on which the AWGs 30a and 30c are formed, and couple the optical switch unit 30b to the AWGs 30a and 30c.

Next, the operations of the optical switch device 3 are explained below.

In the splitting side AWG 30a, wavelength components inputted from the input waveguide wga$_{in}$ propagate through the first slab waveguide SL1, the phase-difference waveguides arr1, and the second slab waveguide SL2, and are then split so as to enter the odd-numbered ones of the output waveguides wg$_{out}$. Similarly, wavelength components inputted from the input waveguide wgb$_{in}$, propagate through the first slab waveguide SL1, the phase-difference waveguides arr1, and the second slab waveguide SL2, and are then split so as to enter the even-numbered ones of the output waveguides wg$_{out}$. The optical switch unit 30b performs switching of optical signals being respectively split from the light inputted from the input waveguides wga$_{in}$ and wgb$_{in}$ and having an identical wavelength, between an odd-numbered waveguide and an even-numbered waveguide.

In the combining-side AWG 30c, wavelength components which are switched by the optical switch unit 30b from the odd-numbered waveguides to the even-numbered waveguides propagate through the even-numbered ones of the input waveguides wg$_{in}$, the third slab waveguide SL3, the phase-difference waveguides arr2, and the fourth slab waveguide SL4, and are outputted into the waveguide wgb$_{out}$. In addition, wavelength components which are switched by the optical switch unit 30b from the even-numbered waveguides to the odd-numbered waveguides propagate through the odd-numbered ones of the input waveguides wg$_{in}$, the third slab waveguide SL3, the phase-difference waveguides arr2, and the fourth slab waveguide SL4, and are outputted into the waveguide wga$_{out}$.

When the optical switch unit 30b does not exchange wavelength components being respectively split from the light inputted from the input waveguides wga$_{in}$ and wgb$_{in}$ and having an identical wavelength, the wavelength components split from the light inputted from the input waveguide wga$_{in}$ are outputted into the waveguide wga$_{out}$, and the wavelength components split from the light inputted from the input waveguide wgb$_{in}$ are outputted into the waveguide wgb$_{out}$.

As explained above, the optical switch device 3 according to the second embodiment can achieve effects which are almost identical to the optical switch device 1 according to the first embodiment. In addition, in the optical switch device 3 according to the second embodiment, the optical circulators Cr1 and Cr2 arranged in the optical switch device 1 are unnecessary. If the cost reduction in production of optical waveguide devices exceeds the cost reduction in production of micro-optical devices such as the optical circulators in the future, it will become possible to produce the optical switch device 3 at lower cost than the optical switch device 1.

Further, the various modifications of the optical switch device 1 according to the first embodiment as explained before can also be applied to the optical switch device 3 according to the second embodiment.

Third Embodiment

Hereinbelow, an optical switch device according to the third embodiment is explained with reference to FIG. 13.

Figure 13:
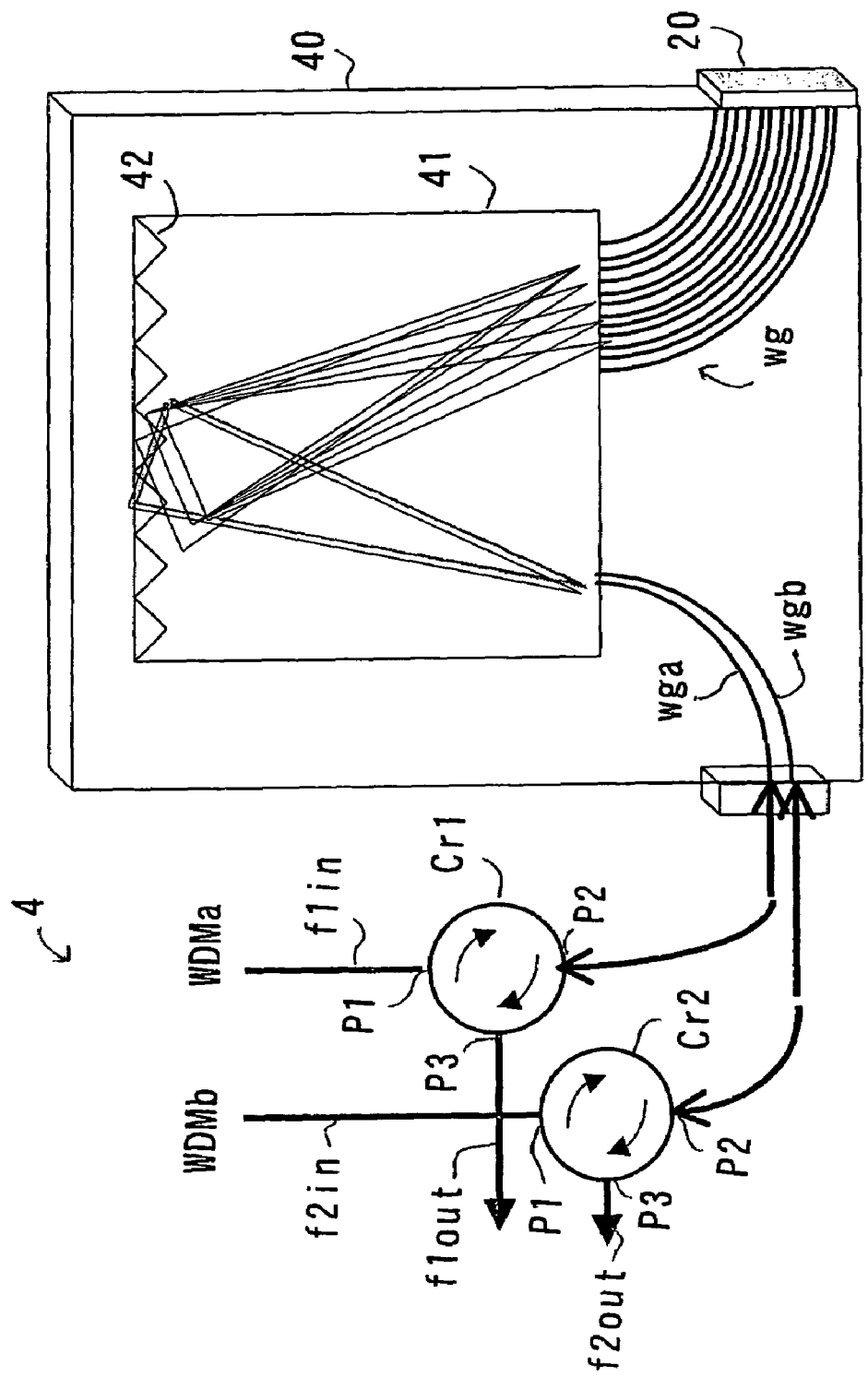
FIG. 13 is a diagram illustrating a construction of an optical switch device according to a third embodiment of the present invention.

FIG. 13 is a diagram illustrating a construction of the optical switch device according to the third embodiment. In the optical switch device 4 according to the third embodiment, a reflection-type spatial grating is formed in a single slab waveguide, instead of providing the AWG 10. According to the third embodiment, it is also possible to achieve effects which are almost identical to the effects of the optical switch device 1. The optical switch device 4 comprises a light splitting unit 40, an optical switch unit 20, and optical circulators Cr1 and Cr2, and performs switching of wavelength components of inputted WDM signals WDMa and WDMb at each wavelength. The optical switch device 4 according to the third embodiment is different from the optical switch device 1 according to the first embodiment in that the light splitting unit 40 is arranged instead of the AWG 10.

The light splitting unit 40 comprises input waveguides wga and wgb, a slab waveguide 41, a reflection-type spatial grating 42 (arranged in the slab waveguide 41), and output waveguides wg. The input waveguides wga and wgb, the slab waveguide 41, the reflection-type spatial grating 42, and the output waveguides wg are formed, for example, on a SiO$_2$ layer formed on a Si substrate. The input waveguides wga and wgb and the output waveguides wg are arranged in a similar manner to the optical switch device 1 according to the first embodiment.

The slab waveguide 41 spreads light which is transmitted from the input waveguides wga and wgb. The reflection-type spatial grating 42 diffracts and reflects the spread light in such a manner that the spread and reflected light is split into wavelength components. The wavelength components of the spread and reflected light are intensified by interference in such a manner that the respective wavelength components are condensed in different ones of the output waveguides wg. Thus, the light which is transmitted from the input waveguides wga and wgb is split into the wavelength components in the output waveguides wg. Then, in similar manners to the first embodiment, the wavelength components are switched by the optical switch unit 20, and are thereafter outputted into the input waveguides wga and wgb.

Since the optical switch device 4 has the above construction, the optical switch device 4 according to the third embodiment can achieve effects which are almost identical to the optical switch device 1 according to the first embodiment.

Fourth Embodiment

Although the reflection-type spatial grating 42 in the optical switch device 4 according to the third embodiment is formed on the substrate in the example of FIG. 13, alternatively, it is possible to separately produce the reflection-type spatial grating 42, and thereafter couple the reflection-type spatial grating 42 to the substrate.

Figure 14:
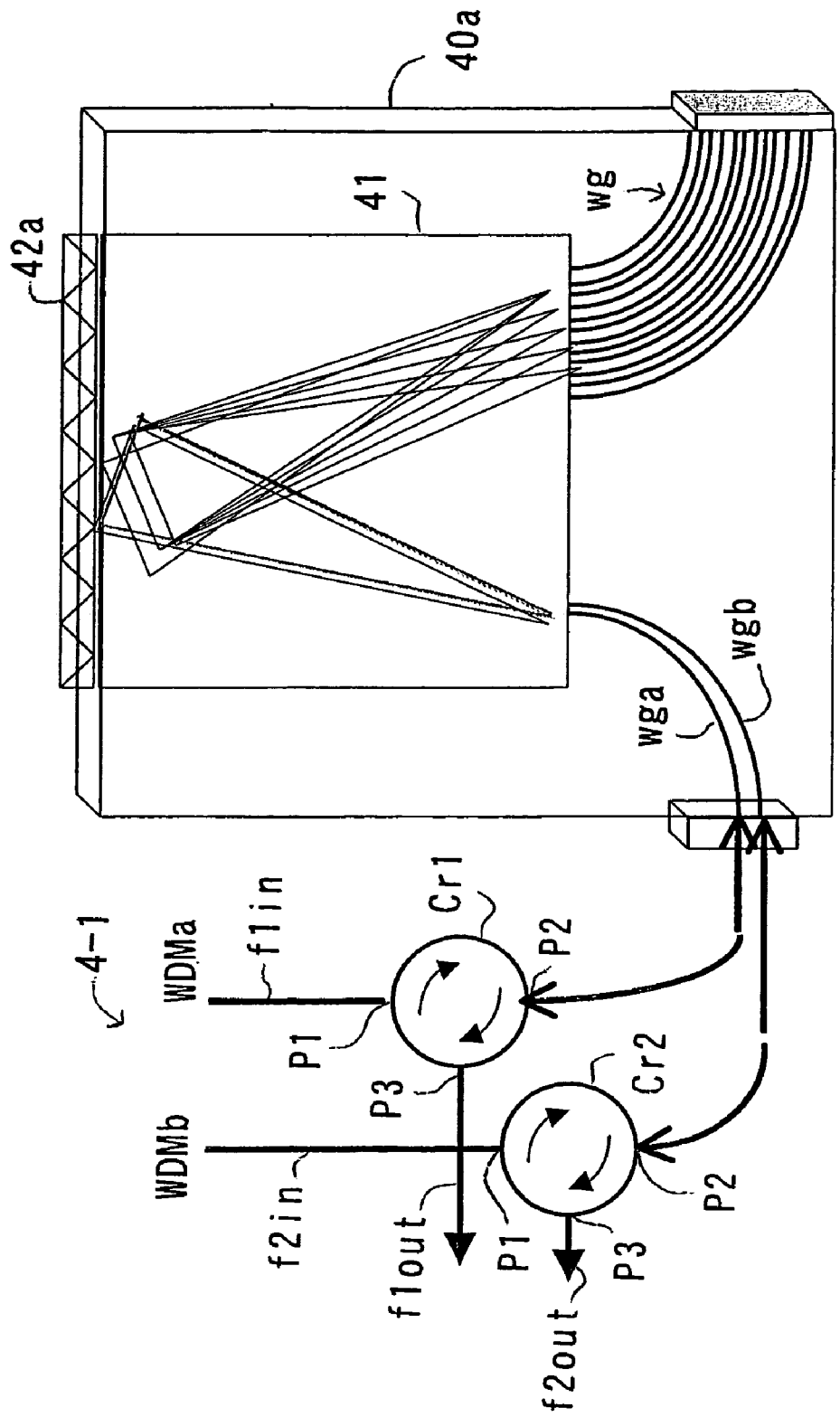
FIG. 14 is a diagram illustrating a construction of an optical switch device according to a fourth embodiment of the present invention.

FIG. 14 is a diagram illustrating a construction of an optical switch device according to the fourth embodiment. The optical switch device 4-1 according to the fourth embodiment is different from the optical switch device 4 according to the third embodiment in that the reflection-type spatial grating 42a in the optical switch device 4-1 is separately formed on, for example, a surface of metal such as aluminum, and is thereafter coupled to an end face of the waveguide substrate in the light splitting unit 40a.

Fifth Embodiment

Figure 15:
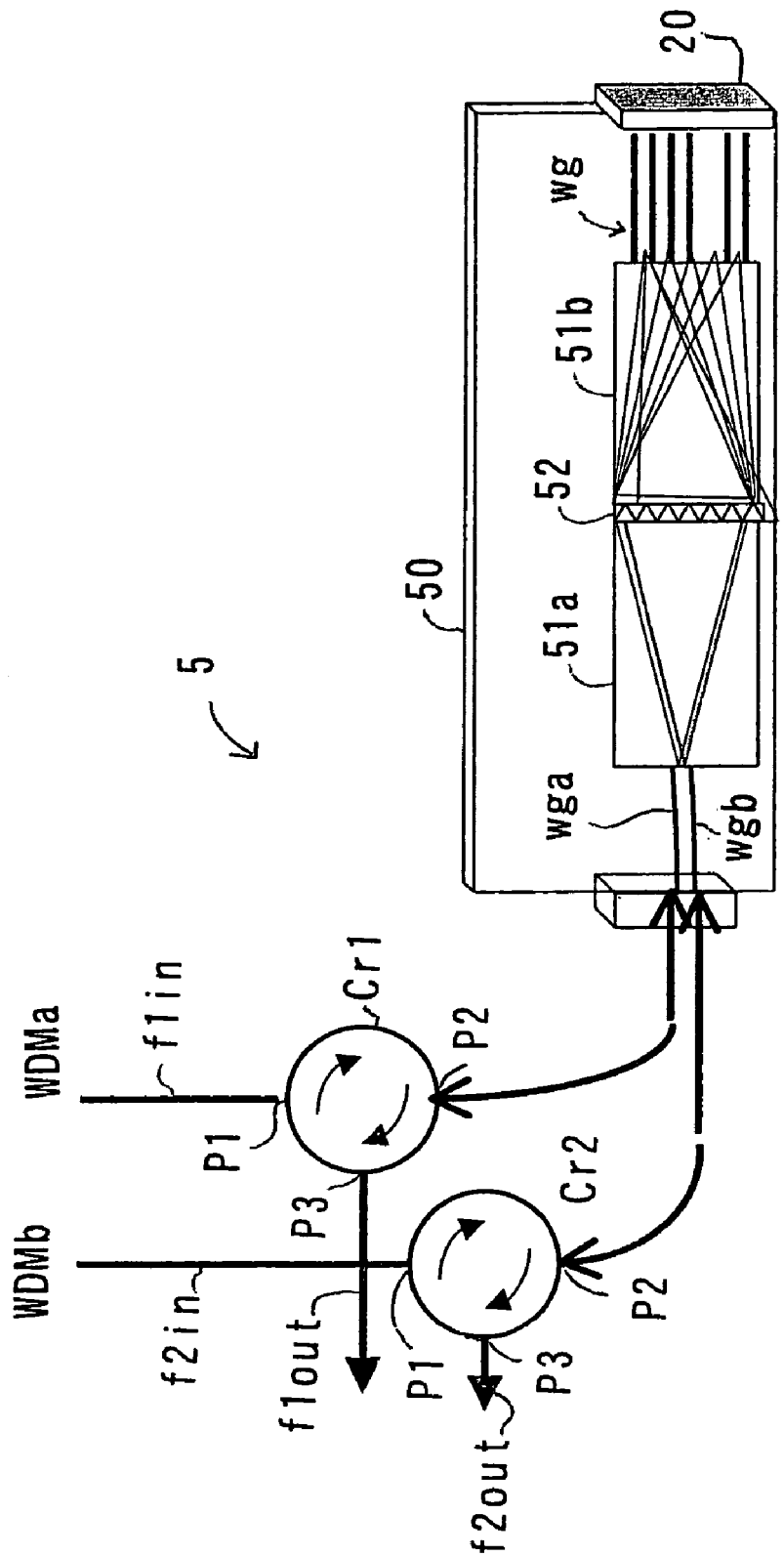
FIG. 15 is a diagram illustrating a construction of an optical switch device according to a fifth embodiment of the present invention.
Figure 16:
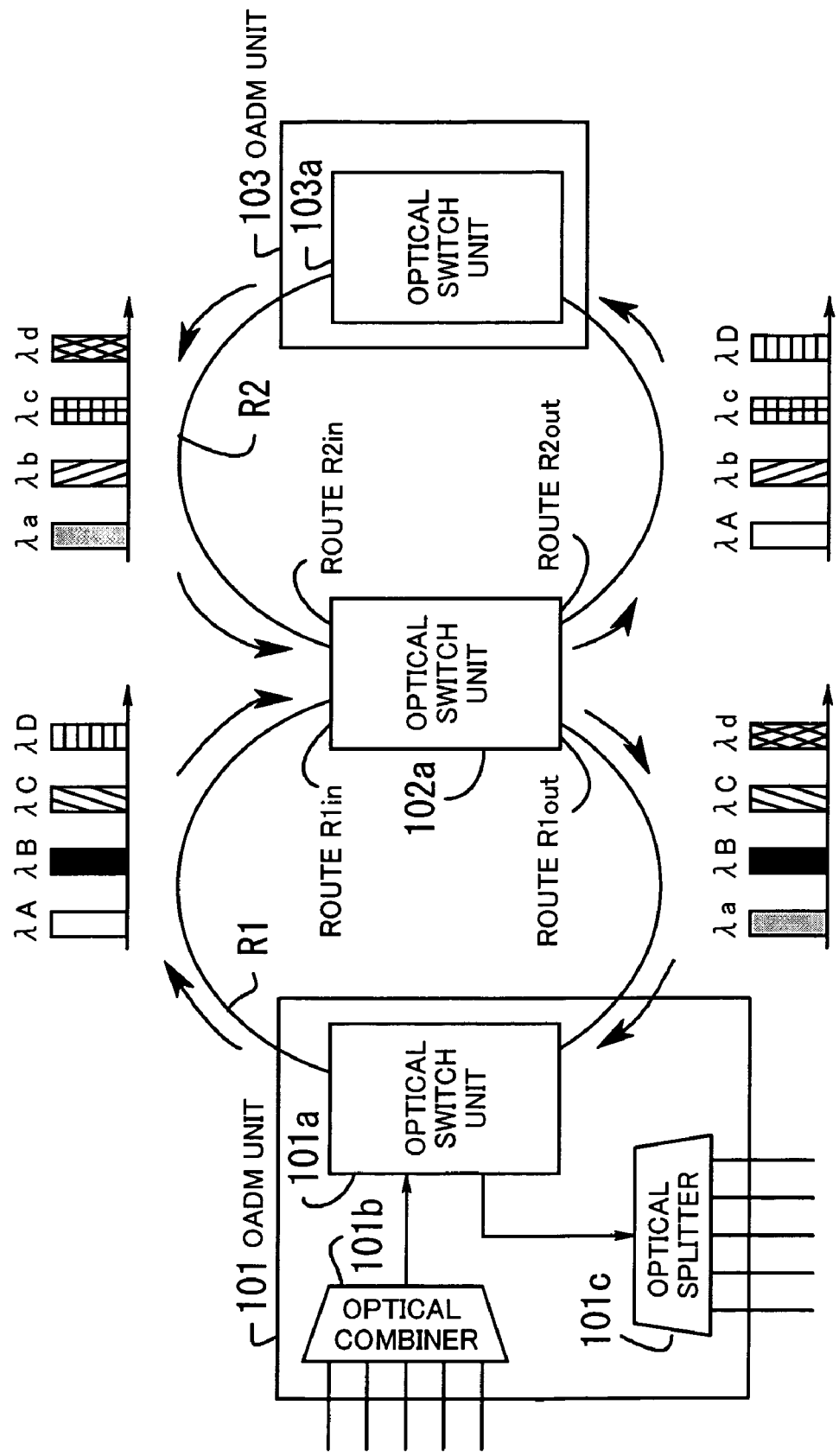
FIG. 16 is a diagram schematically illustrating an example of optical crossconnection.
Figure 17:
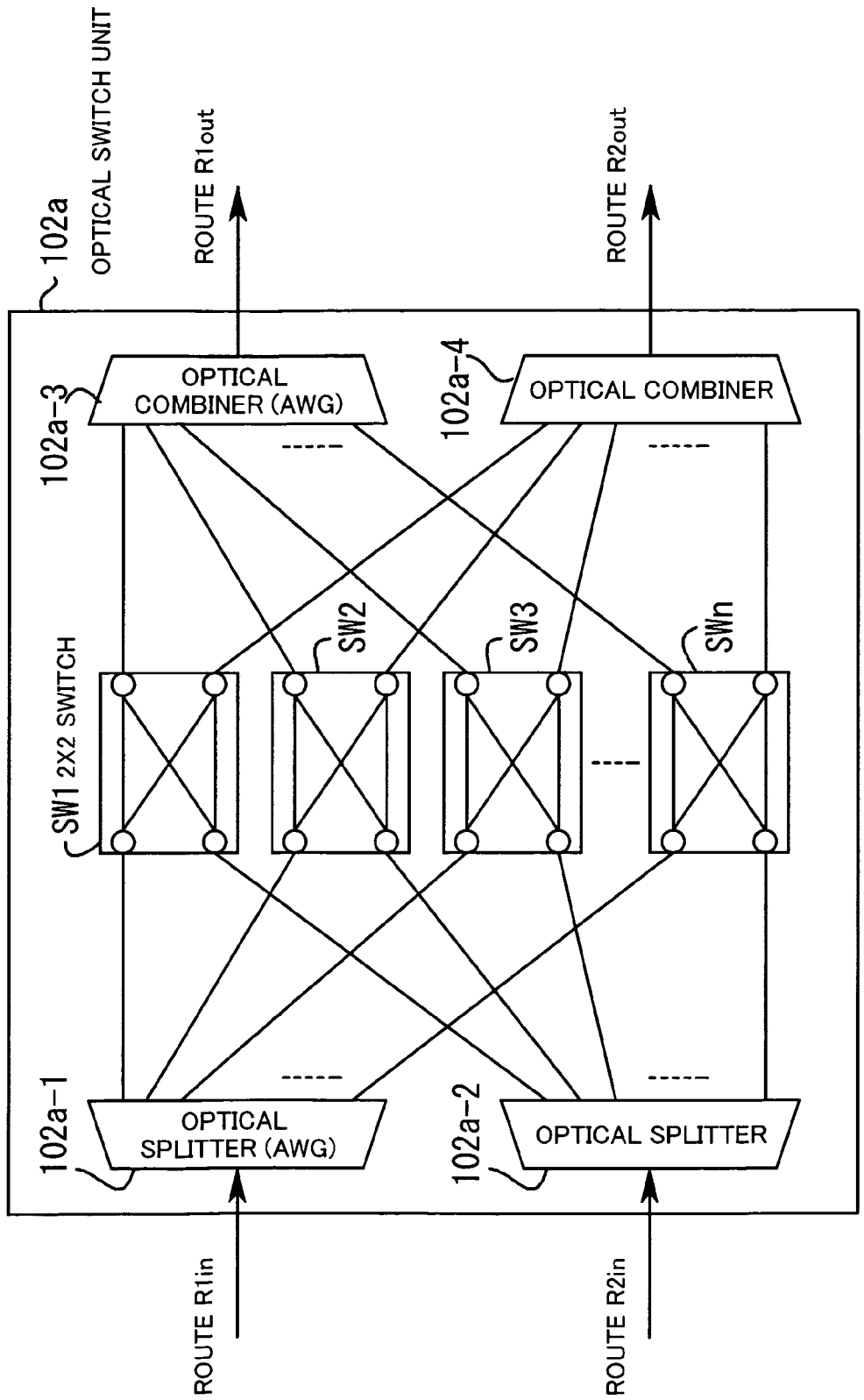
FIG. 17 is a diagram illustrating a construction of a conventional optical switch device.

FIG. 15 is a diagram illustrating a construction of an optical switch device according to the fifth embodiment. In the optical switch device 5 according to the fifth embodiment, a transmission-type spatial grating is arranged instead of the reflection-type spatial grating. The optical switch device 5 comprises a light splitting unit 50, an optical switch unit 20, and optical circulators Cr1 and Cr2, and performs switching of wavelength components of inputted WDM signals WDMa and WDMb at each wavelength. The optical switch device 5 according to the fifth embodiment is different from the optical switch device 1 according to the first embodiment in that the light splitting unit 50 is arranged instead of the AWG 10.

The light splitting unit 50 comprises input waveguides wga and wgb, slab waveguides 51a and 51b, a transmission-type spatial grating 52, and output waveguides wg, which are formed, for example, on a $SiO_2$ layer formed on a Si substrate. The input waveguides wga and wgb and the output waveguides wg are arranged in a similar manner to the optical switch device 1 according to the first embodiment.

The slab waveguide 51a spreads light which is transmitted from the input waveguides wga and wgb. The transmission-type spatial grating 52 diffracts and transmits the spread light so as to produce transmission light. The slab waveguide 51b spreads the transmission light by diffraction in such a manner that wavelength components of the spread transmission light are intensified by interference, and condensed in different ones of the output waveguides wg. Thus, the light which is transmitted from the input waveguides wga and wgb is split into the wavelength components in the output waveguides wg. Then, in similar manners to the first embodiment, the wavelength components are switched by the optical switch unit 20, and are thereafter outputted into the input waveguides wga and wgb.

Even when the transmission-type spatial grating is used as above, the optical switch device 5 according to the fifth embodiment can achieve effects which are almost identical to the optical switch device 1 according to the first embodiment.

ADVANTAGES OF THE INVENTION

As explained above, in the optical switch device according to the present invention, the waveguide grating includes output waveguides arranged with such a pitch as to realize a split wavelength gap equal to or smaller than half of a gap between operating wavelengths of optical signals, and at least two input waveguides arranged with the same pitch. In addition, the optical switch unit arbitrarily selects different optical signals in an identical wavelength band in a pair of adjacent ones of the output waveguides, and performs 2×2 switching of the different optical signals so that the switched optical signals are outputted from the at least two input waveguides. Thus, it is possible to reduce the size and cost of the wavelength-selective switch included in the optical switch device, and construct an economical and highly operable photonic network.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical switch device for switching optical signals, comprising:
   a waveguide grating which includes,
      output waveguides arranged with such a pitch as to realize a split wavelength gap equal to or smaller than half of a gap between operating wavelengths of optical signals,
      at least two input waveguides arranged with the pitch,
      phase-difference waveguides which make optical path differences between portions of light which propagate through the phase-difference waveguides,
      a first slab waveguide which spreads first light transmitted from the at least two input waveguides so as to output the first light into the phase-difference waveguides, and condenses second light transmitted from the phase-difference waveguides so as to output the second light into the at least two input waveguides, and
      a second slab waveguide which condenses third light transmitted from the phase-difference waveguides, for each of a plurality of wavelength components of the third light, so as to separately output the plurality of wavelength components of the third light into the output waveguides, and spreads fourth light transmitted from the output waveguides so as to output the fourth light into the phase-difference waveguides; and
   an optical switch unit which selects different optical signals in an identical wavelength band in a pair of adjacent ones of the output waveguides, and performs 2×2 switching of the different optical signals so that the switched optical signals are outputted from the at least two input waveguides.

2. An optical switch device according to claim 1, wherein the at least two input waveguides is a first-route input waveguide and a second-route input waveguide; the waveguide grating is arranged in such a manner that a plurality of wavelength components of light which are inputted from the first-route input waveguide are separately inputted into odd-numbered ones of the output waveguides, and a plurality of wavelength components of light which are inputted from the second-route input waveguide are separately inputted into even-numbered ones of the output waveguides; the optical switch unit can perform switching of wavelength components of light in each wavelength which are respectively inputted from the first-route input waveguide and the second-route input waveguide, between an odd-numbered waveguide and an even-numbered waveguide; the waveguide grating outputs each of at least one first wavelength component of light which is switched by the optical switch unit from a first odd-numbered waveguide to a first even-numbered waveguide, from the second-route input waveguide through a return optical path containing the first even-numbered waveguide, and outputs each of at least one second wavelength component of light which is switched by the optical switch unit from a second even-numbered waveguide to a second odd-numbered waveguide, from the first-route input waveguide through a return optical path containing the second odd-numbered waveguide; and the waveguide grating transmits each of at least one third wavelength component of light which is not switched by the optical switch unit between an odd-numbered waveguide and an even-numbered waveguide, through an optical path through which the each of at least one third wavelength component of light propagates to the optical switch unit, in a reverse direction, and outputs the each of at least one third wavelength component of light from one of the first-route input waveguide and the second-route input waveguide in the case where the each of at least one third wavelength component of light is inputted into the optical switch device from the one of the first-route input waveguide and the second-route input waveguide.

3. An optical switch device according to claim 1, further comprising at least one optical circulator each of which transmits optical signals from an input fiber to one of the at least two input waveguides, and from the one of the at least two input waveguides to an output fiber.

4. An optical switch device according to claim 1, wherein the optical switch unit has branch units each of which makes light transmitted from one of the output waveguides branch off, and realizes 2×2 switching by operating in such a manner that fifth light which is transmitted from each of the output waveguides and branches to a first direction is reflected to the each of the output waveguides, through which the fifth light is returned, and sixth light which is transmitted from the each of the output waveguides and branches to a second direction is reflected to one of the output waveguides adjacent to the each of the output waveguides.

5. An optical switch device according to claim 4, wherein each of the branch units establishes a branch path by utilizing one of a thermo-optic effect, an electro-optic effect, an acoustoptic effect, and a film-boiling phenomenon for changing a refraction index.

6. An optical switch device according to claim 1, wherein the optical switch unit is formed of a material which enables optical switching with low power consumption, and is optically coupled to the waveguide grating, which is produced separately from the optical switch unit.

7. An optical switch device for switching optical signals, comprising:
a splitting-side waveguide grating which includes;
first output waveguides arranged with such a pitch as to realize a split wavelength gap equal to or smaller than half of a gap between operating wavelengths of optical signals,
at least two first input waveguides arranged with the pitch,
first phase-difference waveguides which make optical path differences between portions of light which propagate through the first phase-difference waveguides,
a first slab waveguide which spreads first light transmitted from the at least two first input waveguides so as to output the first light into the first phase-difference waveguides, and
a second slab waveguide which condenses second light transmitted from the first phase-difference waveguides, for each of a plurality of wavelength components of the second light, so as to separately output the plurality of wavelength components of the second light into the first output waveguides;
an optical switch unit which selects different optical signals in an identical wavelength band in a pair of adjacent ones of the first output waveguides, and performs 2×2 switching of the different optical signals; and
a combining-side waveguide grating which includes,
second input waveguides arranged with the pitch and connected to the optical switch unit, where the number of the second input waveguides is identical to the number of the first output waveguides,
at least two second output waveguides arranged with the pitch,
second phase-difference waveguides which make optical path differences between portions of light which propagate through the second phase-difference waveguides,
a third slab waveguide which spreads third light transmitted from the second input waveguides so as to output the third light into the second phase-difference waveguides, and
a fourth slab waveguide which condenses fourth light transmitted from the second phase-difference waveguides so as to output the fourth light into the at least two second output waveguides.

8. An optical switch device according to claim 7, wherein the at least two first input waveguides is a first-route input waveguide and a second-route input waveguide, the at least two second output waveguides is a first-route output waveguide and a second-route output waveguide, the splitting-side waveguide grating is arranged in such a manner that a plurality of wavelength components of light which are inputted from the first-route input waveguide are separately inputted into odd-numbered ones of the output waveguides, and a plurality of wavelength components of light which are inputted from the second-route input waveguide are separately inputted into even-numbered ones of the output waveguides, the optical switch unit can perform switching of wavelength components of light in each wavelength which are respectively inputted from the first-route input waveguide and the second-route input waveguide, between an odd-numbered waveguide and an even-numbered waveguide, and the combining-side waveguide grating transmits each of at least one first wavelength component of light which is switched by the optical switch unit from a first odd-numbered waveguide to a first even-numbered waveguide, from an even-numbered one of the second input waveguides to the second-route output waveguide, transmits each of at least one second wavelength component of light which is switched by the optical switch unit from a second even-numbered waveguide to a second odd-numbered waveguide, from an odd-numbered one of the second input waveguides to the first-route output waveguide, and transmits each of at least one third wavelength component of light which is not switched by the optical switch unit between an odd-numbered waveguide and an even-numbered waveguide, to the first-route output waveguide in the case where the each of at least one third wavelength component of light is inputted into the optical switch device from the first-route input waveguide, or to the second-route output waveguide in the case where the each of at least one third wavelength component of light is inputted into the optical switch device from the second-route input waveguide.

9. An optical switch device according to claim 7, wherein the optical switch unit has branch units each of which makes light transmitted from one of the first output waveguides branch off for realizing 2×2 switching.

10. An optical switch device according to claim 9, wherein each of the branch units establishes a branch path by utilizing one of a thermo-optic effect, an electro-optic effect, an acoustoptic effect, and a film-boiling phenomenon for changing a refraction index.

11. An optical switch device according to claim 7, wherein the optical switch unit is formed of a material which enables optical switching with low power consumption, and is optically coupled to the splitting-side waveguide grating and the combining-side waveguide grating, which are produced separately from the optical switch unit.

12. An optical switch device for switching optical signals, comprising:
a light splitting unit which includes,
output waveguides arranged with such a pitch as to realize a split wavelength gap equal to or smaller than half of a gap between operating wavelengths of optical signals,
at least two input waveguides arranged with the pitch,
a reflection-type spatial grating which diffracts and reflects light propagating to the reflection-type spatial grating, so as to generate reflection light, and
a slab waveguide which spreads first light transmitted from the at least two input waveguides so as to apply the first light to the reflection-type spatial grating, condenses first reflection light generated by the reflection-type spatial grating, for each of a plurality of wavelength components of the first reflection light, so as to separately output the plurality of wavelength components of the first reflection light into the output waveguides, spreads second light transmitted from the output waveguides so as to apply the second light to the reflection-type spatial grating, and condenses second reflection light generated by the reflection-type spatial grating so as to output the second reflection light into the at least two input waveguides; and
an optical switch unit which selects different optical signals in an identical wavelength band in a pair of adjacent ones of the output waveguides, and performs 2×2 switching of the different optical signals so that the switched optical signals are outputted from the at least two input waveguides.

13. An optical switch device according to claim 12, wherein the at least two input waveguides is a first-route input waveguide and a second-route input waveguide; the light splitting unit is arranged in such a manner that a plurality of wavelength components of light which are inputted from the first-route input waveguide are separately inputted into odd-numbered ones of the output waveguides, and a plurality of wavelength components of light which are inputted from the second-route input waveguide are separately inputted into even-numbered ones of the output waveguides; the optical switch unit can perform switching of wavelength components of light in each wavelength which are respectively inputted from the first-route input waveguide and the second-route input waveguide, between an odd-numbered waveguide and an even-numbered waveguide; the light splitting unit outputs each of at least one first wavelength component of light which is switched by the optical switch unit from a first odd-numbered waveguide to a first even-numbered waveguide, from the second-route input waveguide through a return optical path containing the first even-numbered waveguide, and outputs each of at least one second wavelength component of light which is switched by the optical switch unit from a second even-numbered waveguide to a second odd-numbered waveguide, from the first-route input waveguide through a return optical path containing the second odd-numbered waveguide; and the light splitting unit transmits each of at least one third wavelength component of light which is not switched by the optical switch unit between an odd-numbered waveguide and an even-numbered waveguide, through an optical path through which the each of at least one third wavelength component of light propagates to the optical switch unit, in a reverse direction, and outputs the each of at least one third wavelength component of light from one of the first-route input waveguide and the second-route input waveguide in the case where the each of at least one third wavelength component of light is inputted into the optical switch device from the one of the first-route input waveguide and the second-route input waveguide.

14. An optical switch device according to claim 12, further comprising at least one optical circulator each of which transmits optical signals from an input fiber to one of the at least two input waveguides, and from the one of the at least two input waveguides to an output fiber.

15. An optical switch device according to claim 12, wherein the optical switch unit has branch units each of which makes light transmitted from one of the output waveguides branch off, and realizes 2×2 switching by operating in such a manner that third light which is transmitted from each of the output waveguides and branches to a first direction is reflected to the each of the output waveguides, through which the third light is returned, and fourth light which is transmitted from the each of the output waveguides and branches to a second direction is reflected to one of the output waveguides adjacent to the each of the output waveguides.

16. An optical switch device according to claim 15, wherein each of the branch units establishes a branch path by utilizing one of a thermo-optic effect, an electro-optic effect, an acoustoptic effect, and a film-boiling phenomenon for changing a refraction index.

17. An optical switch device according to claim 12, wherein the optical switch unit is formed of a material which enables optical switching with low power consumption, and is optically coupled to the light splitting unit, which is produced separately from the optical switch unit.

18. An optical switch device according to claim 12, wherein the reflection-type spatial grating is arranged on a substrate on which the slab waveguide is formed, or is optically coupled to an end face of the substrate.

19. An optical switch device for switching optical signals, comprising:
a light splitting unit which includes,
output waveguides arranged with such a pitch as to realize a split wavelength gap equal to or smaller than half of a gap between operating wavelengths of optical signals,
at least two input waveguides arranged with the pitch,
a transmission-type spatial grating which diffracts and transmits light propagating to the transmission-type spatial grating, so as to generate transmission light,
a first slab waveguide which spreads first light transmitted from the at least two input waveguides so as to apply the first light to the transmission-type spatial grating, and condenses first transmission light transmitted through the transmission-type spatial grating so as to output the first transmission light into the at least two input waveguides, and
a second slab waveguide which condenses second transmission light transmitted through the transmission-type spatial grating, for each of a plurality of wavelength components of the second transmission light, so as to separately output the plurality of wavelength components of the second transmission light into the output waveguides, and spreads second light transmitted from the output waveguides so as to apply the second light to the transmission-type spatial grating; and
an optical switch unit which selects different optical signals in an identical wavelength band in a pair of adjacent ones of the output waveguides, and performs 2×2 switching of the different optical signals so that the switched optical signals are outputted from the at least two input waveguides.

20. An optical switch device according to claim 19, wherein the at least two input waveguides is a first-route input waveguide and a second-route input waveguide; the light splitting unit is arranged in such a manner that a plurality of wavelength components of light which are inputted from the first-route input waveguide are separately inputted into odd-numbered ones of the output waveguides, and a plurality of wavelength components of light which are inputted from the second-route input waveguide are separately inputted into even-numbered ones of the output waveguides; the optical switch unit can perform switching of wavelength components of light in each wavelength which are respectively inputted from the first-route input waveguide and the second-route input waveguide, between an odd-numbered waveguide and an even-numbered waveguide; the light splitting unit outputs each of at least one first wavelength component of light which is switched by the optical switch unit from a first odd-numbered waveguide to a first even-numbered waveguide, from the second-route input waveguide through a return optical path containing the first even-numbered waveguide, and outputs each of at least one second wavelength component of light which is switched by the optical switch unit from a second even-numbered waveguide to a second odd-numbered waveguide, from the first-route input waveguide through a return optical path containing the second odd-numbered waveguide; and the light splitting unit transmits each of at least one third wavelength component of light which is not switched by the optical switch unit between an odd-numbered waveguide and an even-numbered waveguide, through an optical path through which the each of at least one third wavelength component of light propagates to the optical switch unit, in a reverse direction, and outputs the each of at least one third wavelength component of light from one of the first-route input waveguide and the second-route input waveguide in the case where the each of at least one third wavelength component of light is inputted into the optical switch device from the one of the first-route input waveguide and the second-route input waveguide.

21. An optical switch device according to claim 19, further comprising at least one optical circulator each of which transmits optical signals from an input fiber to one of the at least two input waveguides, and from the one of the at least two input waveguides to an output fiber.

22. An optical switch device according to claim 19, wherein the optical switch unit has branch units each of which makes light transmitted from one of the output waveguides branch off, and realizes 2×2 switching by operating in such a manner that third light which is transmitted from each of the output waveguides and branches to a first direction is reflected to the each of the output waveguides, through which the third light is returned, and fourth light which is transmitted from the each of the output waveguides and branches to a second direction is reflected to one of the output waveguides adjacent to the each of the output waveguides.

23. An optical switch device according to claim 22, wherein each of the branch units establishes a branch path by utilizing one of a thermo-optic effect, an electro-optic effect, an acoustoptic effect, and a film-boiling phenomenon for changing a refraction index.

24. An optical switch device according to claim 19, wherein the optical switch unit is formed of a material which enables optical switching with low power consumption, and is optically coupled to the light splitting unit, which is produced separately from the optical switch unit.

* * * * *